United States Patent [19]
Aldous et al.

[11] Patent Number: 5,547,401
[45] Date of Patent: Aug. 20, 1996

[54] MEDIA CONNECTOR INTERFACE FOR USE WITH A THIN-ARCHITECTURE COMMUNICATIONS CARD

[75] Inventors: Stephen C. Aldous, Salt Lake City; Guy M. Dake, Sandy, both of Utah

[73] Assignee: Megahertz Corporation, Utah

[21] Appl. No.: 291,277

[22] Filed: Aug. 16, 1994

Related U.S. Application Data

[63] Continuation-in-part of Ser. No. 40,656, Mar. 31, 1993, Pat. No. 5,338,210, which is a continuation-in-part of Ser. No. 974,253, Nov. 10, 1992, abandoned, which is a division of Ser. No. 866,670, Apr. 8, 1992, Pat. No. 5,183,404.

[51] Int. Cl.⁶ .................................................. H01R 17/18
[52] U.S. Cl. ............................................. 439/676; 439/946
[58] Field of Search ................................... 439/131, 638, 439/344, 676, 329, 946

[56] References Cited

U.S. PATENT DOCUMENTS

| | | | |
|---|---|---|---|
| 4,648,682 | 3/1987 | Tubbs | 439/916 |
| 4,666,225 | 5/1987 | Hampton et al. | 439/140 |
| 4,758,168 | 7/1988 | Awakowicz et al. | 439/83 |
| 4,980,856 | 12/1990 | Veno | 364/900 |
| 5,013,247 | 5/1991 | Watson | 439/55 |
| 5,178,552 | 1/1993 | Jinno et al. | 439/140 |
| 5,183,404 | 2/1993 | Aldous et al. | 439/329 |
| 5,336,099 | 8/1994 | Aldous et al. | 439/131 |
| 5,338,210 | 8/1994 | Beckham et al. | 439/131 |
| 5,391,094 | 2/1995 | Kakinoki et al. | 439/638 |
| 5,411,405 | 5/1995 | McDaniels et al. | 439/676 |

FOREIGN PATENT DOCUMENTS 64-10585 1/1989 Japan .................................. 439/78

*Primary Examiner*—Neil Abrams
*Attorney, Agent, or Firm*—Workman, Nydegger Seeley

[57] ABSTRACT

A communications card capable of being mounted in electrical communications with a computer has formed therethrough an aperture so sized and shaped as to be capable of receiving a physical/electrical media connector. The cross-section of the media connector is greater than the thickness of the communication card. The media connector also has a biased retention clip, a contact pin block, and contact pins. The retention clip has several standardized characteristics including a broad fixed end protruding from an outer surface of the contact pin block. The broad fixed end tapers abruptly at a transition notch down to a narrow free end, capable of being manipulated by a user to remove the physical/electrical media connector from the aperture in the communications card. In use, a media connector is inserted directly into the aperture in the communications card, the aperture being in contact with a plurality of contact wires fixed within the communications card. The aperture is formed either within the communications card itself, or within a detachable aperture block which may be attached to the communications card.

1 Claim, 17 Drawing Sheets

1

MEDIA CONNECTOR INTERFACE FOR USE WITH A THIN-ARCHITECTURE COMMUNICATIONS CARD

RELATED APPLICATION

This application is a continuation-in-part of application Ser. No. 08/040,656 filed Mar. 31, 1993, issued on Aug. 16, 1994, as U.S. Pat. No. 5,338,210, entitled "MEDIA CONNECTOR INTERFACE FOR USE WITH A PCMCIA-ARCHITECTURE COMMUNICATION CARD," which is a continuation-in-part of application Ser. No. 07/974,253 filed Nov. 10, 1992, now abandoned, entitled "MEDIA CONNECTOR INTERFACE FOR USE WITH A PCMCIA-ARCHITECTURE COMMUNICATION CARD AND METHOD OF MAKING SAME," which is a divisional of application Ser. No. 07/866,670, filed Apr. 8, 1992, now issued as U.S. Pat. No. 5,183,404, on Feb. 2, 1993, entitled "SYSTEMS FOR CONNECTION OF PHYSICAL/ELECTRICAL MEDIA CONNECTORS TO COMPUTER COMMUNICATIONS CARDS."

BACKGROUND

1. The Field of the Invention

The present invention relates to the field of computers. More particularly, it relates to an interface between a connector and a communications card in a computer system, and more specifically to a physical/electrical media connector interface for use with a communications card which is thinner than the physical dimension of the connector.

2. Related Technology

A. Data Transmission

The field of transmission of data by phone lines or network cables is a rapidly expanding field. Users of personal computers in particular are finding such practice to be of great value.

For example, there are numerous public and private networks and databases which store data or programs. Absent the ability to send and receive data over telephone lines through a modem, a user is relegated to relying upon the exchange of discs or tapes in order to receive data suitable for use with their computer.

Similarly, companies performing tasks that are integrated are aided by local area networks ("LANs") which permit personnel to exchange electronically retrievable data. The ability to freely transfer data and information from one computer to another computer over a telephone line may dramatically increase productivity and reduce overall production time.

To translate the binary code utilized by a computer into signals capable of being transmitted over the telephone lines, modems have been developed to translate and reconfigure binary signals into analog signals capable of being transmitted over telephone lines. For conversion of signals to take place, a modem must be placed between the computer generating the binary signals and the telephone line capable of carrying the analog signals.

Typically, in today's practice, a modem at the transmitting computer end of a telephone line receives binary digital data from the computer and converts the binary code received from the computer into modem frequency signals. These modem frequency signals are then transmitted over the telephone lines to a receiving modem at the receiving computer.

The modem at the recipient's end then converts the modem frequency signal back to binary digital data characters and inputs the data characters to the input port of the receiving computer.

As today's modems serve to provide a compatible interface between the phone lines and the computer, the Federal Communications Commission ("FCC") and telephone companies require an interface to moderate all signals or energy being input into the phone lines. This interface protects the phone lines and systems from damage, thereby ensuring the integrity and quality of transmissions over the phone lines.

A required part of this interface is a Data Access Arrangement ("DAA") circuit. The DAA circuit provides an impedance match and also serves to isolate the modem and the computer from transient signals and other disturbances coming in over the phone line. The DAA also protects the phone line from disabling influences emanating from the computer or the modem.

For example, damage would occur to the telephone system if instead of transmitting frequency signals, DC power was transmitted over the phone lines. Because the modem is attached directly to the phone line, the modem must incorporate the required FCC interface and must comply with any requirements imposed by local telephone companies.

The ubiquity of the telephone and the need for interactive systems throughout the world have caused standards to be established for the components of a telephonic system. Standardization allows telephone systems and devices using those systems to be interchangeable. The components of the telephone that are most thoroughly standardized are physical/electrical media connectors.

Physical/electrical media connectors are used by almost all telephone companies throughout the world for many applications, the most important of which is interconnection of telephones with telephone lines. For this reason, stringent standardization of connectors is required if compatibility and interactivity is to be realized.

One popular physical/electrical media connector used in the United States of America is the RJ-11 6-position miniature modular plug physical/electrical media connector. The RJ-11 is used between the telephone line and the telephone itself.

Unfortunately, because of the physical and electrical differences between the many pins of the peripheral ports associated with the central processing unit of a computer and the 6 pins of the RJ-11, direct physical or electrical connection of the RJ-11 to the computer is not possible.

Consequently, it has been found necessary to employ modems or similar input/output devices or cards to effect communication between computers and telephone lines. Modems reconfigure binary data from the central processing unit of the computer as received through the multi-pin peripheral port. The reconfigured data is then transmitted in analog form through the RJ-11 physical/electrical media connector into the telephone line.

B. Local Area Networks

In contradistinction to the development of telephone lines, transmission lines used in LANs have been developed specifically for the transmission of computer generated signals. Because of the recent development of these transmission lines, a variety of internal configurations for transmission lines have been developed to accomplish the transmission of computer data between computers.

Three basic cable types are available for use in transmitting encoded signals from one place to another: (1) coaxial, (2) twisted-pair, and (3) fiber optic. Each has certain advantages and disadvantages.

A typical local area network comprises several computers at remote locations throughout a building interconnected with unshielded twisted pair cable utilizing RJ-type physical/electrical media connectors. The network is typically connected to a file server. A file server is a computer providing shared access to a file system, printer, electronic mail service, or modem. The file server is a combination of hardware and software that contains files shared by everyone connected to the LAN.

As LANs utilizing unshielded twisted pair cable are capable of transmitting signals at a higher rate than signals travelling through telephone lines, the requirements of the devices used to translate and reconfigure signals from the computer for transmission through lines have consequently been developed with different requirements.

The counterpart to the modem in telephonic communications is the LAN adapter card or data communications card. In a similar fashion to a modem, these communications cards reconfigure the parallel data produced by the computer into a serial form and back. These cards also provide buffering, encoding and decoding, cable access, and transmission.

As the use of LANs increases, it has become increasingly more beneficial for users of portable computers to have the ability to interact with several local area networks at different locations. For example, information at one location may be downloaded to a portable computer that allows a user to manipulate the data during a business trip and load the manipulated data onto the network at a destination.

As the popularity of twisted-pair cable has increased, the popularity of the most frequently used physical/electrical media connector, the 8-pin miniature modular plug, has also increased. This increase in popularity of the 8-pin miniature modular plug has introduced the same problems and solutions into LANs as will be discussed regarding the RJ-11 physical/electrical media connector in the development of modems.

C. Modem Development

1. External Modems

Many modems in use today are configured as external accessory units, housed in their own cases, and attached to the computer. Such a prior art modem is illustrated in FIG. 1 of the drawings. A modem 10 is shown near a telephone base 12 which cradles a telephone receiver 14. Modem 10 is electrically connected to the telephone with a telephone extension line utilizing physical/electrical media connectors at each end. Signals transmitted by a modem at a remote location are received over a telephone line 16. An RJ-11 physical/electrical media connector 18 is used to physically and electrically connect a local telephone extension line 20 to telephone line 16. Another RJ-11 connector is used to connect extension line 20 to modem 10.

Modem 10 converts the modem frequency signal back to binary digital data characters. The digital characters are then transmitted through a multiplexed cable 22 to an input port of a receiving computer 24. In the prior art system illustrated in FIG. 1, a DAA circuit is located within modem 10 at the point where the modem interfaces with telephone extension line 20. At this location, the DAA circuit isolates the modem and the computer from disturbances coming in or going out over the phone line.

External modems like modem 10 are often employed by users of personal computers. External modems have been popular because they can easily contain a substantial amount of electronic circuitry or hardware, as well as executable programs or software.

With the advent of downsizing technology in other computer components, however, smaller portable computers have taken the place of many of the desktop models. With the new-found portability available with smaller portable computers, the size of external modems has made external modems cumbersome and not in keeping with the portability that buyers of these downsized computers desire.

D. Integral Modems

To overcome the inconvenience and physical limitations of external modems, smaller modems have been developed that are small enough to be built into the housing of a portable computer. Such a modem is illustrated in FIG. 2. An integral internal modem 30 is located within the housing of a portable computer 32 at a position giving access to local telephone extension line 20. The interface between the telephone line and modem 30 is achieved through the use of an RJ-11 physical/electrical media connector and an internal DAA 34. The RJ-11 physical/electrical media connector has two components: an RJ-11 socket and an RJ-11 plug.

An RJ-11 socket 36 is formed in the housing of computer 32. This socket is capable of receiving an RJ-11 plug 38 from any of the many telephone lines utilizing an RJ-11 physical/electrical media connector system.

The ubiquity of the RJ-11 system provides users of portable computers with internal modems a uniform standard interface for media access devices such as modems. Modem manufacturers can build products capable of accepting the RJ-11 media connector with confidence that their product can be used in a wide geographical area. Because modems can be built to the RJ-11 uniform standard, consumers benefit from the ability to interchange and interconnect media access devices without the need for adapters for products made by different manufacturers.

E. Communication Cards

As computer housings have continued to be downsized, internal spatial restrictions have required the establishment of standards for the internal accessories of the computer. One set of standards applicable to memory cards has been developed by the Personal Computer Memory Card International Association (PCMCIA). This organization is comprised of hundreds of manufacturers of memory cards and related peripheral equipment. The PCMCIA has determined that the spatial standard for all memory cards used in downsized computers should be restricted to a rectangular space approximately 55 mm in width, 85 mm in length, and 5 mm in depth.

In addition to the PCMCIA Standard, other standards are currently in development. Each proposal contains various specifications including device form factor and specific electrical characteristics. The specifications may include both computer peripherals as well as memory cards. One trend, however, common to many of these proposals is the trend to smaller, thinner peripheral cards.

In keeping with the standards for small memory and peripheral cards, internal modem manufacturers have adopted the same spatial standards for use with their downsized communications cards. By complying with the standards for established and future cards, communications card manufacturers have assured themselves of compatibility and spatial conformity with computers utilizing the standards. These standards, current and future, are referred to herein as "thin-architecture" standards.

The constraints imposed by these standards have resulted in the development of "credit card" communications cards.

Most of the components formerly housed within a modem are now contained within a credit card-sized wafer. One communications card conforming to the PCMCIA standard is produced by Intel under the ExCA® trademark and is similar to that illustrated in FIG. 3.

Although the communications card illustrated serves the functions of a modem, a similar card has been contemplated for use in LANs.

FIG. 4 illustrates the PCMCIA standard 68 pin socket 42 which is pressed over a corresponding plug affixed to the circuit board of the computer. This plug and socket arrangement provides versatility in the selection of cards that a user may select for use with the computer. For example, extra memory cards also utilize the same PCMCIA architecture standards mad may therefore be inserted over the same plug as is used with thin-architecture communications card 40. Other standards may define different connectors.

FIG. 5 illustrates peripheral socket 44 in a thin-architecture communications card 40. Socket 44 is built into communications card 40 to correspond to the variety of plugs employed by different manufacturers. For example, socket 44 is used to interface with external media access units that contain elements of integrated modems that have not been included within the thin-architecture communications card 40.

Elements not included within the communications card illustrated in FIG. 5 include the RJ-type connector interface and the DAA. The DAA and the connector interface used in the system illustrated in FIG. 5 are housed in an external unit (often referred to as an "intermediate physical/electrical connector" or "podule"). The shape and configuration of peripheral socket 44 varies with the needs of the manufacturers of the external intermediate physical/electrical connectors.

FIG. 6 illustrates another form of peripheral socket like that illustrated in FIG. 5. External intermediate physical/electrical connector socket 46 has a shape capable of receiving a corresponding plug for use with the DAA and RJ-11 interface housed in a podule br modem transmissions or an 8 pin modular plug interface for use with LANs. Socket 46 is manufactured into communications card 40 for use with a specific external DAA and RJ-11 interface podule. As a result, although the RJ-11 media connector is available at most locations providing telephone service, a user will still be unable to utilize an integral modem if a compatible external DAA and RJ-11 interface podule corresponding to socket 46 is not available.

FIG. 7 depicts communications card 40 inside of a downsized computer. External intermediate physical/electrical connector socket 46 is shown incorporated into communications card 40 and extending to an exposed position so that connection can be made therewith. An intermediate physical/electrical connector podule 48 houses an external DAA 50 and RJ-11 enclosed socket 36. Podule 48 is in electrical connection with communications card 40 through an external physical/electrical connector plug 52 and a connector cord 54.

In use, a telephone line is physically and electrically connected to RJ-11 enclosed socket 36 with an RJ-11 plug to form a communications interface. Incoming signals are then filtered through external DAA 50 and pass through connector cord 54 to external physical/electrical connector plug 52. A second communications interface is formed between connector plug 52 and connector socket 46. As discussed previously, the RJ-11 communications interface is widely available, while the second communications interface between connector plug 52 and connector socket 46 is manufacturer-specific. After passing through the second communications interface, signals are translated from analog modem frequency to binary signals compatible with the computer.

The current and future thin-architecture communications cards are less than the depth of a media connector such as the RJ-type or 8-pin miniature modular plug which is approximately 8–12 mm. As a result, an RJ-11 or other modular connector exceeds the depth restrictions imposed by the thin-architecture computer components. Direct internal connection of the physical/electrical media connector would necessitate encroaching on a neighboring card space—an approach advocated by some manufacturers, but requiring the sacrifice of space that could be used to provide additional memory capacity.

While an external DAA and adaptor solve the problem of incompatibility between computers and modems or LANs, the solution necessitates carrying an extra item (namely the external DAA podule) whenever use of the modem is desired. The necessity of incorporating external DAA circuitry and enclosed sockets to accommodate external physical/electrical connector plugs, increases the size and cost of external podules. Furthermore, the podules cannot be made as thin as the communications card. This reduces some of the advantages of easy portability of downsized computers. The larger the podule, the more portability is reduced.

Another solution advocated by some manufacturers to the incompatibility of the RJ-11 connector with a thin-architecture memory card size constraints is illustrated in FIG. 8. Thin-architecture communications card 40 is shown with an integrated physical/electrical connector 56 attached at the location where enclosed socket 44 is usually located. A small DAA is located within integrated connector 56 to filter signals passing therethrough. RJ-11 connector socket 36 is formed in a free end of connector 56. The height of connector 56 is approximately 10 mm, thereby allowing RJ-11 socket 36 to be contained therein. Incorporation of integrated connector 56 allows an 8 mm RJ-11 plug to interface with the thinner communications card 40.

FIG. 9 illustrates the communications card and connector of FIG. 8 installed in a laptop computer. Although communications card 40 complies with the thin-architecture size restrictions, the 10 mm integrated connector 56 does not. As a result, integrated connector 56 must either be placed outside of the computer housing or must displace memory cards in adjoining slots.

Operation of the communications card requires only the connection of an RJ-11 plug into RJ-11 enclosed socket 36 or an RJ-45 or 8 pin modular plug for use in LANs. Signals received from remote modems are filtered by the internal DAA and converted by communications card 40.

As computer manufacturers continually seek to improve their product, new types of computers and new sizes of computers are continually being developed. For example, laptop and notebook computers are being introduced which are thinner and lighter than previous laptop and notebook computers. Additionally, computer manufacturers have developed entirely new lines of "palmtop" computers. These computers are smaller than traditional laptop or notebook computers. They are designed to be more portable than any previous generation of computers. Finally, computer manufacturers are just starting to introduce an entirely new generation of computing devices called Personal Data Assistants or "PDA's." These smaller, portable computing devices may not contain the traditional look or elements of laptop or notebook computers.

As each new advance is made in computer technology, new and smaller form factors for peripherals such as communication cards are expected to be developed. Clearly, the trend is to smaller and lighter computers and peripherals. As the trend in downsizing continues, the problem associated with connecting to external communication media such as LANs and telephone networks will become more difficult. The traditional standard connectors, such as RJ-type connectors, are much too large to be connected to a thin-architecture communication card in the traditional manner.

It would, therefore, be an advancement in the art to provide a thin-architecture communications card that is capable of direct connection with a miniature modular plug physical/electrical media connector.

Yet another advancement in the art would be to provide a direct media connector interface for use in laptop, notebook, palmtop or PDA computers that does not displace contiguous memory cards.

A further advancement in the art would be to provide a communications card that complies with any thin-architecture memory card space configuration limitations while also providing direct connection with a miniature modular plug physical/electrical media connector.

Yet another advancement in the art would be to allow use of external, detachable aperture blocks which are thinner than the cross-section of media connectors, but which still accommodate a direct connection to a physical/electrical media connector.

Still another advancement in the art would be to provide a communications card/media connector interface that is free from reliance on an enclosed physical/electrical media connector socket.

A still further another advancement in the art would be to provide a communications card connecting system that is free from reliance on any components which extend into external space allocated to adjacent thin-architecture memory slots.

Another advancement in the art would be to provide a LAN adaptor card capable of direct connection with a miniature modular plug physical/electrical media connector.

Yet another advancement in the art would be to provide a LAN adaptor card connecting system that is free from reliance on any components which extend into external space allocated to adjacent thin-architecture memory slots.

OBJECTS AND BRIEF SUMMARY OF THE INVENTION

It is, therefore, one object of the present invention to provide a thin-architecture communications card that is capable of direct connection with a miniature modular plug physical/electrical media connector.

Another object of the present invention is to provide a direct media connector interface for use in laptop, notebook, palmtop or PDA computers that does not displace contiguous memory cards.

Yet another object of the present invention is to provide a communications card that complies with the a thin-architecture memory card space configuration limitations while also providing direct connection with a miniature modular plug physical/electrical media connector.

Another object of the present invention is to provide external, detachable aperture blocks which are thinner than the cross-section of media connectors, and which contain no external DAA circuitry, but which still accommodate a direct connection to a physical/electrical media connector.

Still another object of the present invention is to provide a communications card/media connector interface that is free from reliance on an enclosed physical/electrical media connector socket.

A further object of the present invention is to provide a communications card connecting system that is free from reliance on any components which extend into external space allocated to adjacent thin-architecture memory slots.

A still further object of the present invention is to provide a LAN adaptor card capable of direct connection with a miniature modular plug physical/electrical media connector.

Yet a further object of the present invention is to provide a LAN adaptor card connecting system that is free from reliance on any components which extend into external space allocated to adjacent thin-architecture memory slots.

Additional objects and advantages of the invention will be set forth in the description which follows, and in pan will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein, an interface for use between a miniature modular plug physical/electrical media connector and a thin-architecture communications card such as used in laptop, notebook, palmtop or PDA computers is provided.

The physical/electrical media connector (such as an RJ-11) capable of being used with the present invention has a biased retention clip, a contact pin block, and contact pins. The retention clip has several standardized characteristics, including a broad fixed end protruding from an outer surface of the contact pin block. The broad fixed end tapers abruptly at a transition notch to a narrow free end. A user manipulates the narrow free end to disengage the media connector from the communications card.

In use, a media connector (such as an RJ-type 6 or 8-pin miniature modular plug) is inserted directly into an aperture in a communications card having a plurality of contact wires in electrical connection with both the computer and the aperture. This direct connection obviates the need for any adapters to facilitate connection of the media connector to the communications card.

The aperture is sized and configured so as to be capable of receiving the media connector. The orientation of the aperture to the communications card is important as the contact wires must be in electrical contact with the contact pins in the media connector to properly communicate electrical signals therethrough.

Accordingly, one aspect of the invention overcomes the limitations of the thin-architecture communication card by orienting the aperture at an angle relative to the face of the communications card. An aperture foraged normal to the surface of the communications card, without additional structures, would not allow retention of both the retention clip and the bottom of the connector pin block. The transition notch in the retention clip must be captured by a retention ridge located more than the thickness of the communications card from the tip of the media connector. The thin-architecture restriction thus prevents any structure from capturing the transition notch and the bottom of the connector pin block.

By angling the aperture, however, sufficient surface area may be exposed within one side of the aperture to capture the transition notch with a retention ridge while simultaneously supporting the bottom of the connector pin block with an abutment ledge.

Means for utilizing tension produced between the biased retention clip and the aperture to secure the contact pin block to the communications card with at least one of the contact pins in electrical engagement with at least one of the plurality of contact wires are also provided.

The tension utilizing means have a broad retention clip groove formed in a wall of the aperture capable of accepting the broad fixed end of the retention clip. The broad retention clip groove has a floor and walls and a retention ridge formed in at least one of the walls of the broad retention clip groove. The retention ridge is capable of capturing the transition notch of the retention clip as tension produced between the biased retention clip and the opposing wall of the aperture urge the broad fixed end of the retention clip into the broad retention clip groove.

Simultaneously, the transition notch is forced over the retention ridge by the tension between the connector pin block and an opposing wall of the aperture as the media connector is pushed into the aperture.

Means for preventing passage of the contact pin block completely through the aperture in the communications card are also utilized in the present invention. In one embodiment, the passage prevention means utilize a ledge protruding into the aperture from one of the walls of the aperture to prevent passage of the connector pin block completely through the communications card. In another embodiment, the passage prevention means utilize a mechanically biased retention structure to prevent passage of the connector pin block completely through the communications card. The passage prevention means allows the elimination of many of the structures of an RJ-type socket.

Alternate embodiments of the invention incorporate stirrups of a variety of shapes capable of engaging either the transition notch of the retention clip to retain the physical/electrical media connector against the communications card or the bottom of the contact pin block.

One embodiment utilizes an open retention channel to provide lateral support to a media connector that is inserted parallel to the face of the communications card. A depending stirrup captures the media connector and maintains the media connector in electrical contact with exposed contact wires fixed in the retention channel.

Still other embodiments utilize a variety of structures to exert an opposing force on the media connector as it is inserted to the aperture. The aperture is configured to capture the biased retention clip. The captured biased retention clip and the opposing force serve to hold the media connector in place.

Another embodiment of the present invention utilizes an aperture formed perpendicular to the surface of the communications card. Complete passage through the aperture is prevented by a depending stirrup blocking the travel of the contact pin block completely through the aperture. Unlike other embodiments of the invention utilizing angles other than perpendicular, this embodiment overcomes the depth restrictions of the thin-architecture communications architecture by allowing the contact pin block to protrude below the plane of the lower surface of the communications card to a point where it is captured by the depending stirrup and prevented from further travel. Structures formed in the aperture such as a retention ridge capture the biased retention clip and hold the physical/electrical media connector in electrical communication with the retractable aperture block of the communications card.

Other embodiments of the present invention utilizing apertures formed perpendicular to the surface of the communications card employ a variety of structures to prevent the contact pin block from passing completely through the aperture. One such structure is a flexible diaphragm attached to the bottom of the aperture. Another structure is a mechanically biased face plate which exerts an upward force on the contact pin block when the media plug is inserted into the aperture. Yet another embodiment prevents passage of the contact pin block completely through the aperture by means of a mechanically biased retention structure.

Methods for manufacturing the interface and systems for directly accessing the interface in the communications card are also contemplated by the present invention.

One system for directly accessing the interface utilizes means for selectively exposing a retractable aperture block of the communications card outside of the computer housing. This system allows the communications card to be carried internally within the housing of the computer when the communications card is not in use.

When needed, one embodiment provides a retractable aperture block of the communications card which can be directly accessed by manipulating an actuating mechanism which releases means for retaining a portion of a communications card within a computer housing thereby allowing means for biasing to push the retractable aperture block of the card external to the computer housing. The travel of the retractable aperture block is limited so that the retractable aperture block of the communications card will remain in electrical contact with the remainder of the communications card.

After exposure of the retractable aperture block of the communications card, the media connector is inserted directly into the aperture to facilitate electrical connection between the telephone line and the computer. After use, the retractable aperture block of the communications card is reinserted back into the computer housing to be carried internally when not in use.

Another system for directly accessing the interface utilizes a detachable aperture block without any included DAA circuitry. The detachable aperture block may be of the same thickness as the thin-architecture communication card itself. In this manner, access to the communication card may be achieved while interference with adjacent communication cards, if any, is eliminated. The media connector is inserted directly into the detachable aperture block. After use, the media connector and aperture block are removed.

With the above systems, no enclosed RJ-11 or RJ-45 connector socket is needed. The elimination of the enclosed RJ-11 or RJ-45 connector socket reduces the overall height required for the media connector interface.

Additional height reduction is accomplished in some embodiments by angling the aperture relative to the upper face of the communications card. This angular orientation allows the aperture in the communications card to present a longer realized aspect relative to the media connector to allow capture of the transition notch therein.

When combined with the height reduction provided by the elimination of the need for an enclosed RJ-type connector socket, the angular orientation of the aperture allows for direct connection of a conventional RJ-11 media connector with a thin-architecture communications card.

The thin-architecture communications cards contemplated in this invention utilize integral DAA circuitry. As a result, no extra components need be included with the direct connection aperture systems disclosed in this invention. Any readily available RJ-11 media connector may be directly inserted into the aperture in the communications card.

The present invention also contemplates a LAN adaptor connection system utilizing thin-architecture communications cards configured for use with a local area network. In use, a physical/electrical media connector having a physical structure described in FCC Part 68, subpart F physical/electrical media connector is inserted directly into the aperture in the thin-architecture LAN adaptor card.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are therefore not to be considered limiting of its scope, the invention will be described with additional specificity and detail through the use of the accompanying drawings in which.

DETAILED DESCRIPTION OF THE PREFERRED EMBODIMENTS

As used in this patent, the phrase thin-architecture communications card refers to a communications card having a thickness less than the cross-section of a miniature modular jack physical/electrical media connector.

The term miniature modular jack physical/electrical media connector connotes a media connector such as those connectors having physical attributes described in F.C.C.

Part 68, subpart F. Specific terms such as RJ-type, RJ-11, RJ-45, 6-pin miniature modular plug, 8-pin miniature modular plug. etc. are all references to specific exemplary physical/electrical media connectors capable of functioning with the falling within the broader parameters of the term physical/electrical media connectors and should not be used to limit the scope of the invention to specific connectors.

The term "cross-section of a miniature modular jack physical/electrical media connector" means the width and height of the miniature modular jack when viewed from the end which is inserted into the aperture.

DETAILED DESCRIPTION OF THE PREFERRED EMBODIMENTS

As used in this patent, the phrase thin-architecture communications card refers to a communications card having a thickness less than the cross-section of a miniature modular jack physical/electrical media connector.

The term miniature modular jack physical/electrical media connector connotes a media connector such as those connectors having physical attributes described in F.C.C. Part 68, subpart F. Specific terms such as RJ-type, RJ-11, RJ-45, 6-pin miniature modular plug, 8-pin miniature modular plug, etc. are all references to specific exemplary physical/electrical media connectors capable of functioning with the present invention.

The term "cross-section of a miniature modular jack physical/electrical media connector" means the width and height of the miniature modular jack when viewed from the end which is inserted into the aperture.

The term surface as used in this application describes a three-dimensional outer boundary. The surface is construed to extend to any structures extending from or attached to the object being described. It will be appreciated that this definition of surface incorporates planer as well as curved geometries. Thus a surface may begin as a planer geometry, for example, in describing the top of a thin-architecture communication card and extend to incorporate attached structures which may not be co-planer with the initial plane describing the surface, for example in the case of an attached aperture block with a thickness that varies from the thickness of the communication card.

Figure 10:
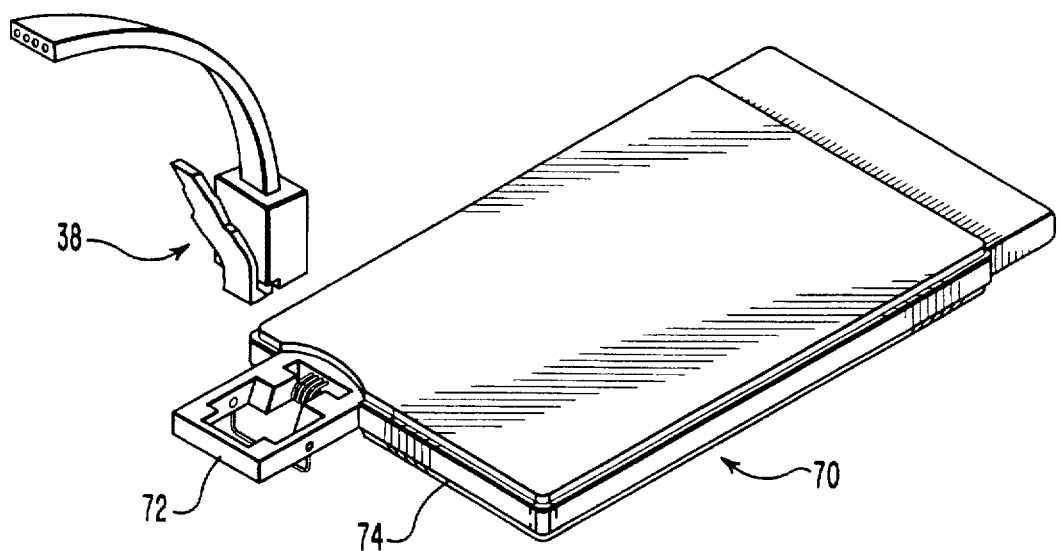
FIG. 10 is a perspective of one embodiment which incorporates a retractable aperture block.

FIG. 10 illustrates a thin-architecture communications card 70 having an aperture block 72 and a fixed portion 74. A physical/electrical media connector is also shown generally as 38. Aperture block 72 is retractable into fixed portion 74. Fixed portion 74 is in electrical connection to a computer (not shown). Aperture block 72 is in electrical connection with fixed portion 74. This figure illustrates, generally, one system for achieving direct connection to a physical/electrical media connector 38 with a thin-architecture communications card 70.

Figure 11:
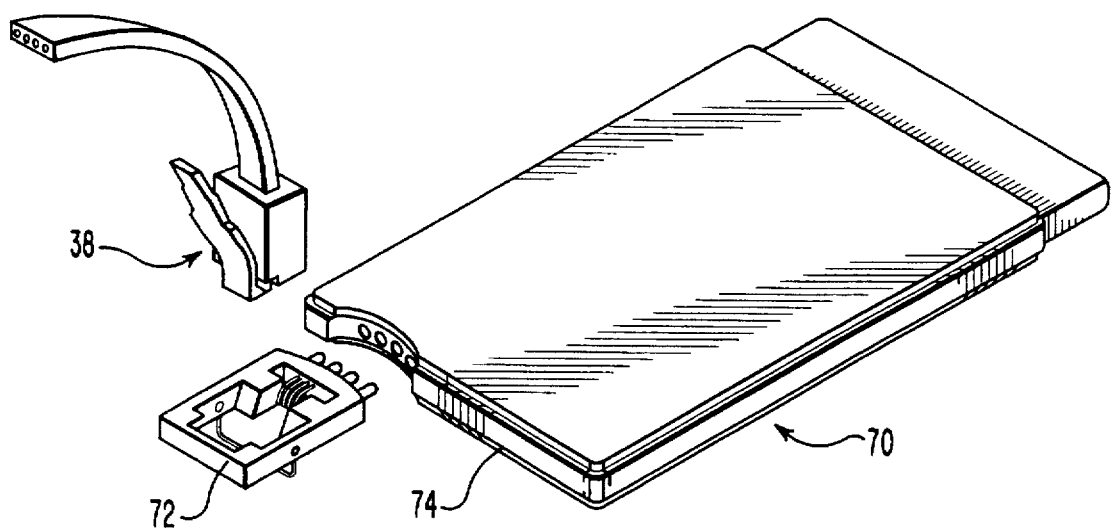
FIG. 11 is a perspective of one embodiment which incorporates a detachable aperture block.

FIG. 11 illustrates a thin-architecture communications card 70 also having an aperture block 72 and a fixed portion 74. In this embodiment, aperture block 72 is detachable from fixed portion 74. This is another general system for achieving direct connection to a physical/electrical media connector 38 with a thin-architecture communications card 70. Detachable aperture block 72 is in electrical connection with fixed portion 74 when attached. Fixed portion 74 is in electrical connection with a computer (not shown). As used in this application, the term aperture block refers to either an aperture block that is retractable as depicted in FIG. 10, or an aperture block that is detachable as depicted in FIG. 11. In the absence of any specific designation, the term aperture block should be construed throughout this application to include either or both retractable and detachable functions.

Figure 1:
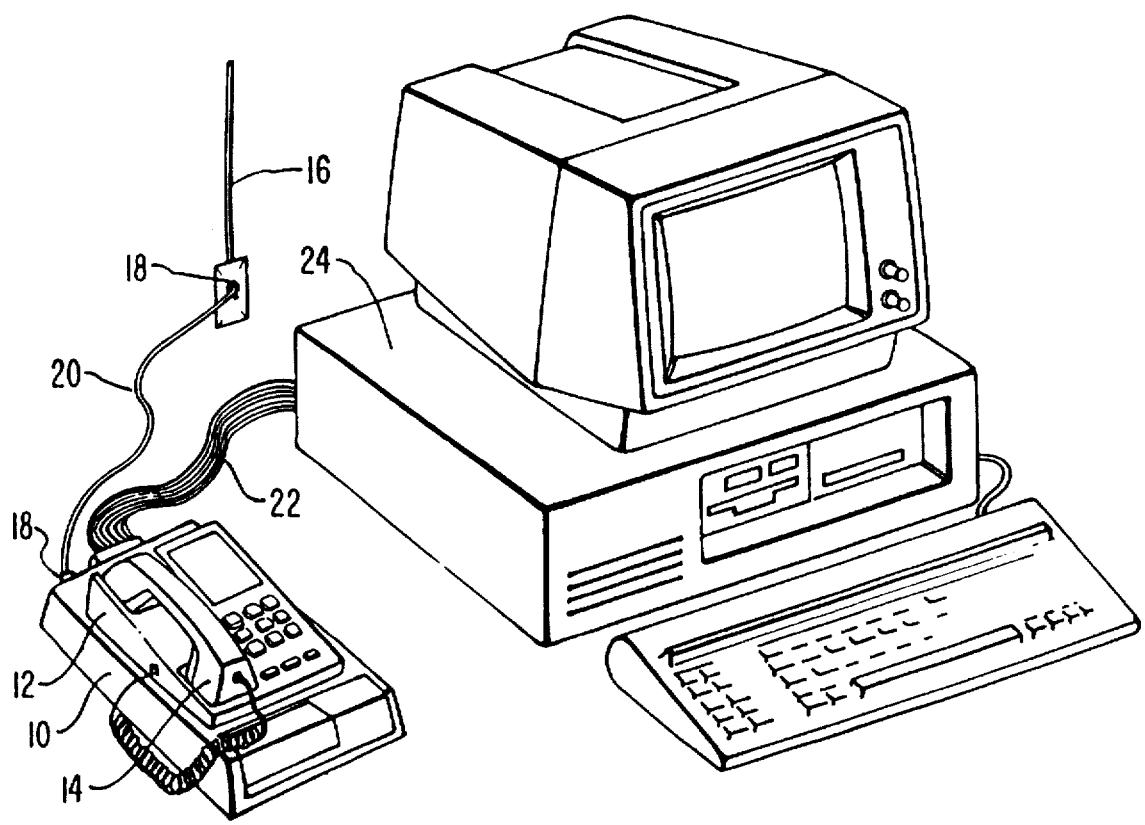
FIG. 1 is a perspective view of a prior art external modem.
Figure 2:
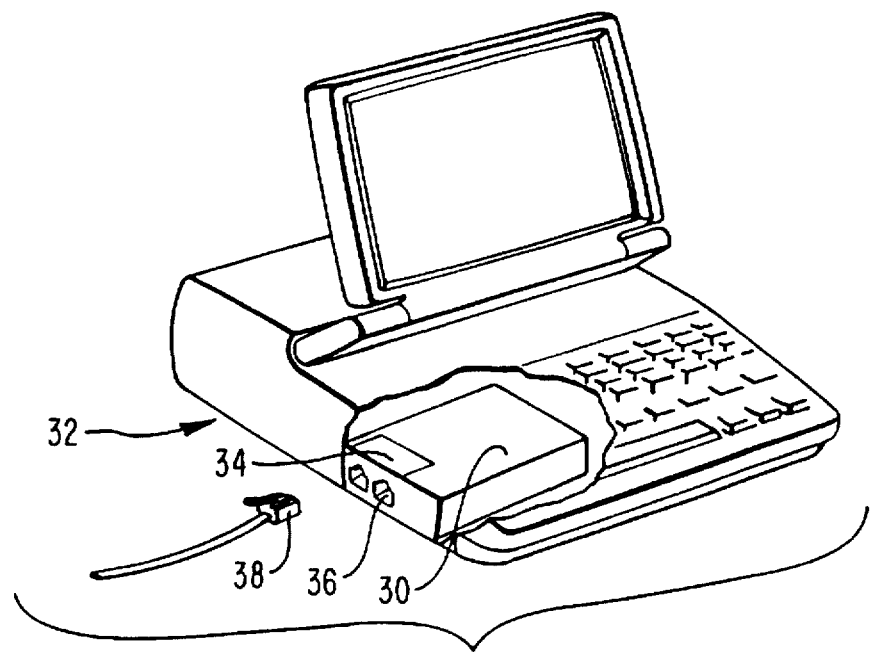
FIG. 2 is a perspective view of a prior art integral modem installed in a portable computer.
Figure 3:
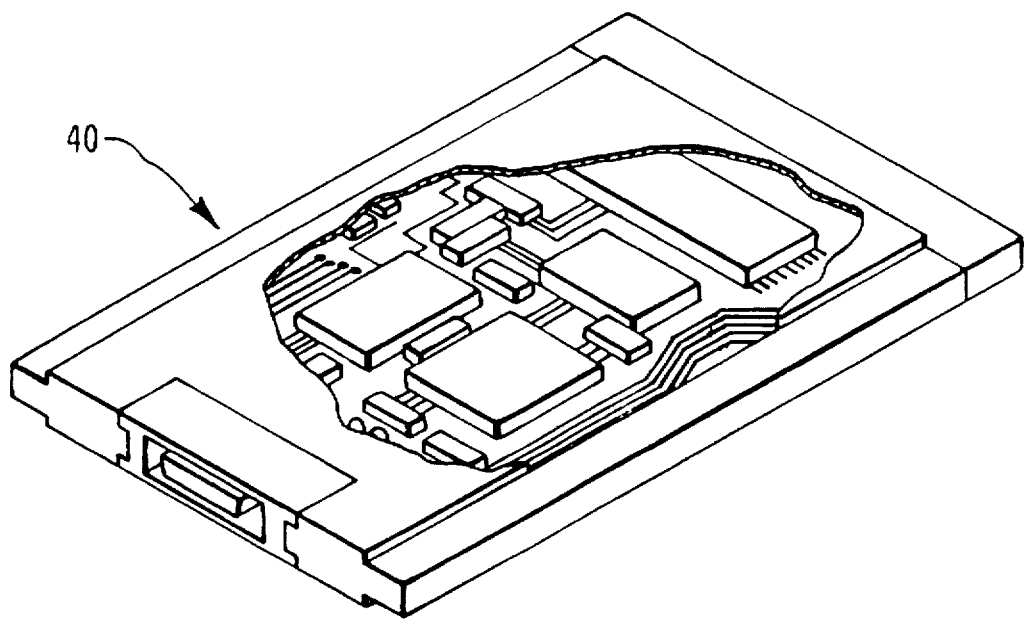
FIG. 3 is a partially cut away perspective view of a thin-architecture communications card.
Figure 4:
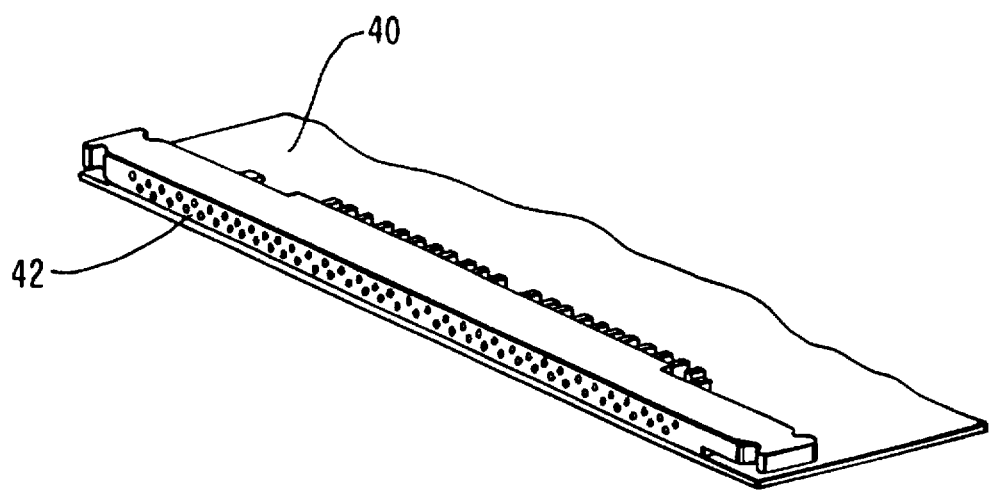
FIG. 4 is a perspective view of a 68 pin connector end of a communications card like the thin-architecture communications card illustrated in FIG. 3.
Figure 5:
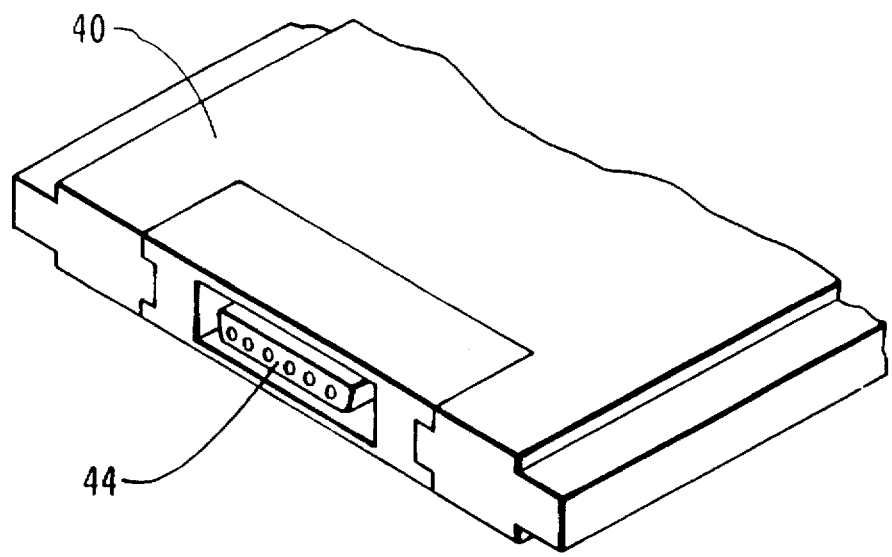
FIG. 5 is an enlarged perspective view of the other end of the thin-architecture communications card illustrated in FIG. 3 having formed therein a manufacture-specific peripheral socket.
Figure 6:
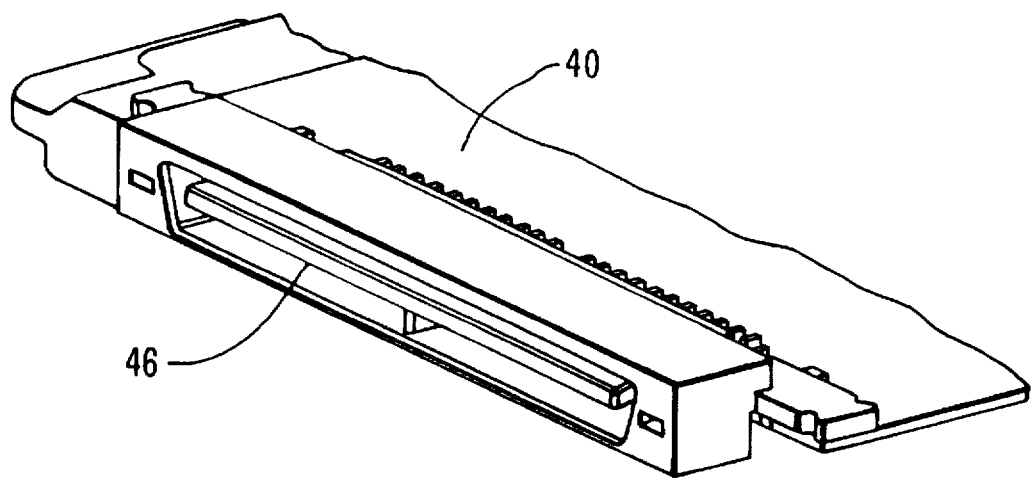
FIG. 6 is an enlarged perspective view of a manufacturer-specific peripheral socket like that illustrated in FIG. 5 utilizing a different podule plug.
Figure 7:
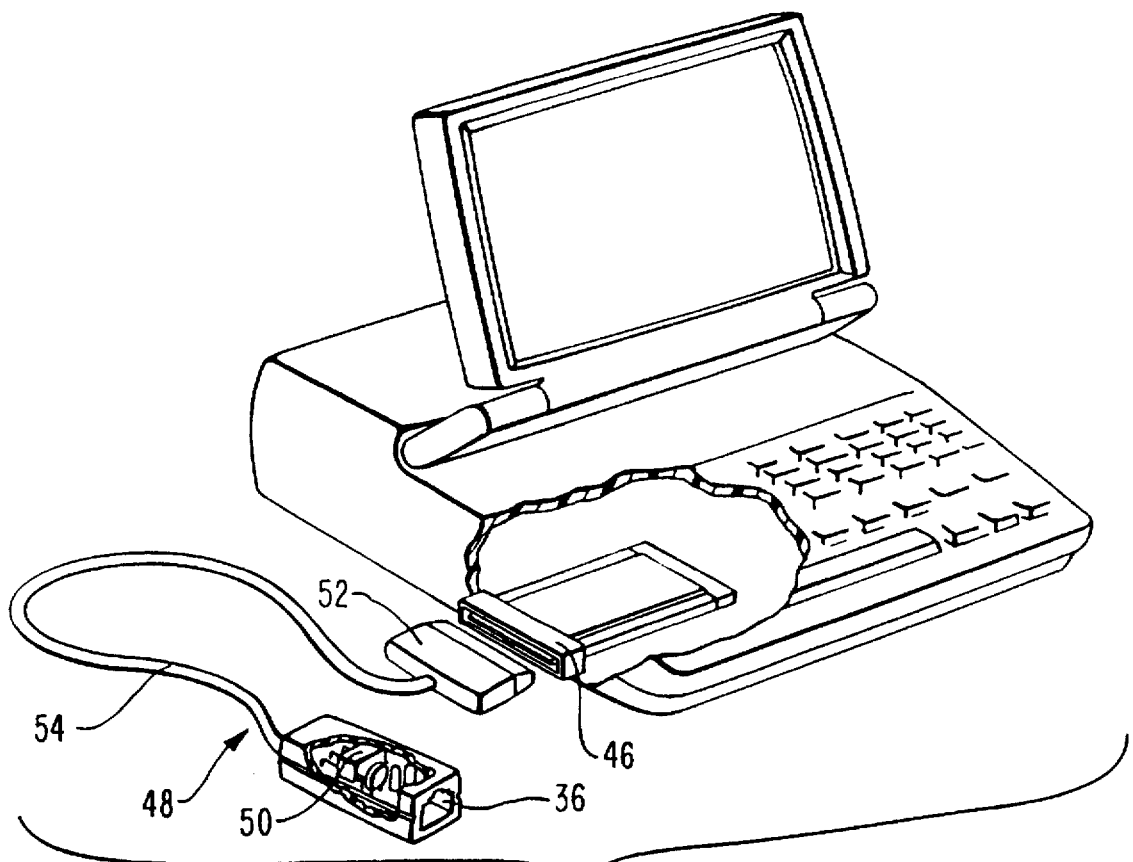
FIG. 7 is a partially cut away perspective view of a portable computer having installed therein an thin-architecture communications card capable of attachment to an intermediate physical/electrical connector.
Figure 8:
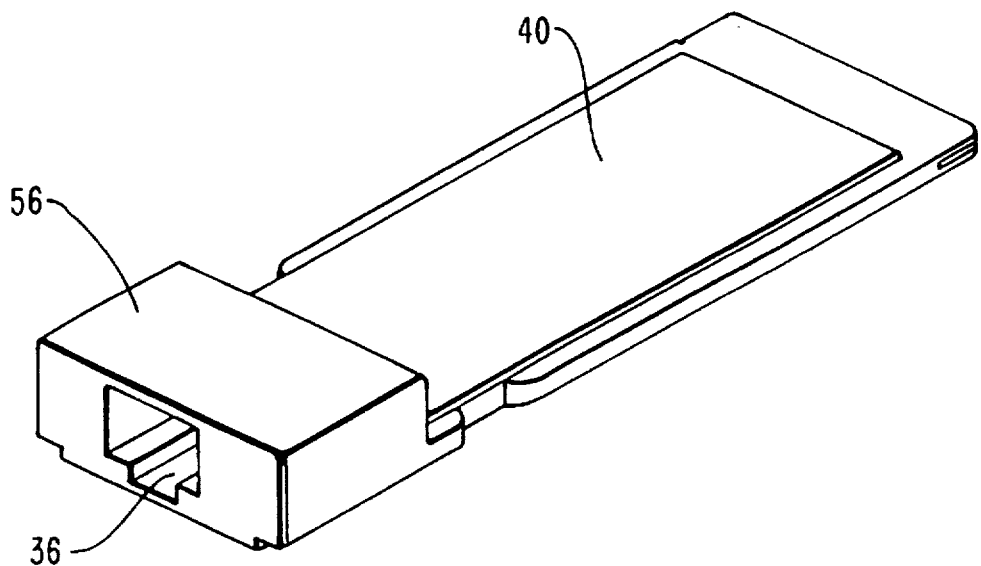
FIG. 8 is a perspective view of an thin-architecture communications card utilizing an integral DAA and physical/electrical media connector socket.
Figure 9:
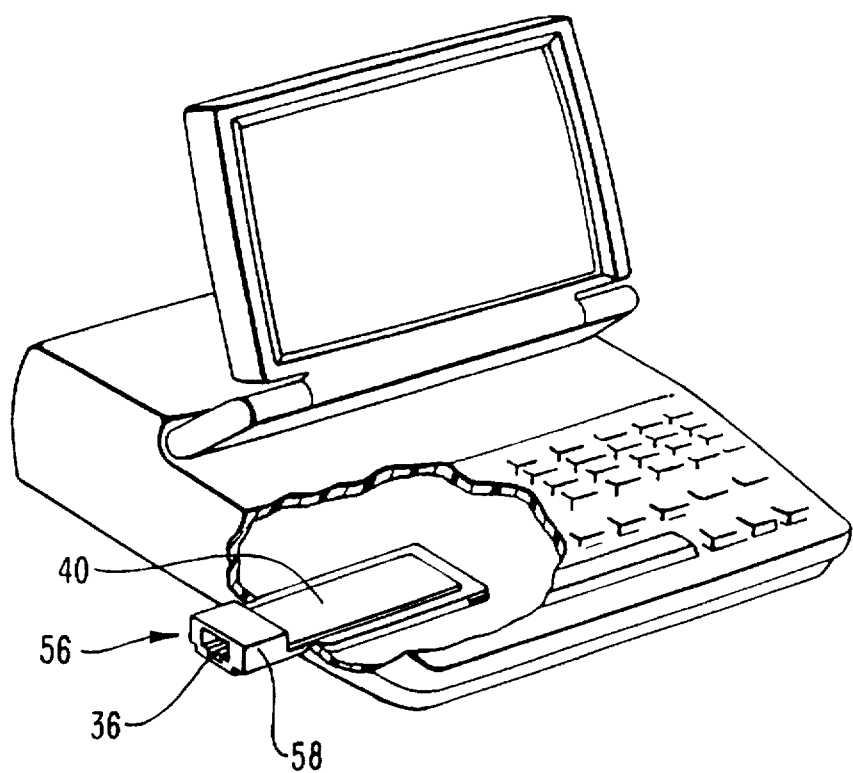
FIG. 9 is partially cut away perspective view of an installation of the communications card illustrated in FIG. 8 into a portable computer.
Figure 12:
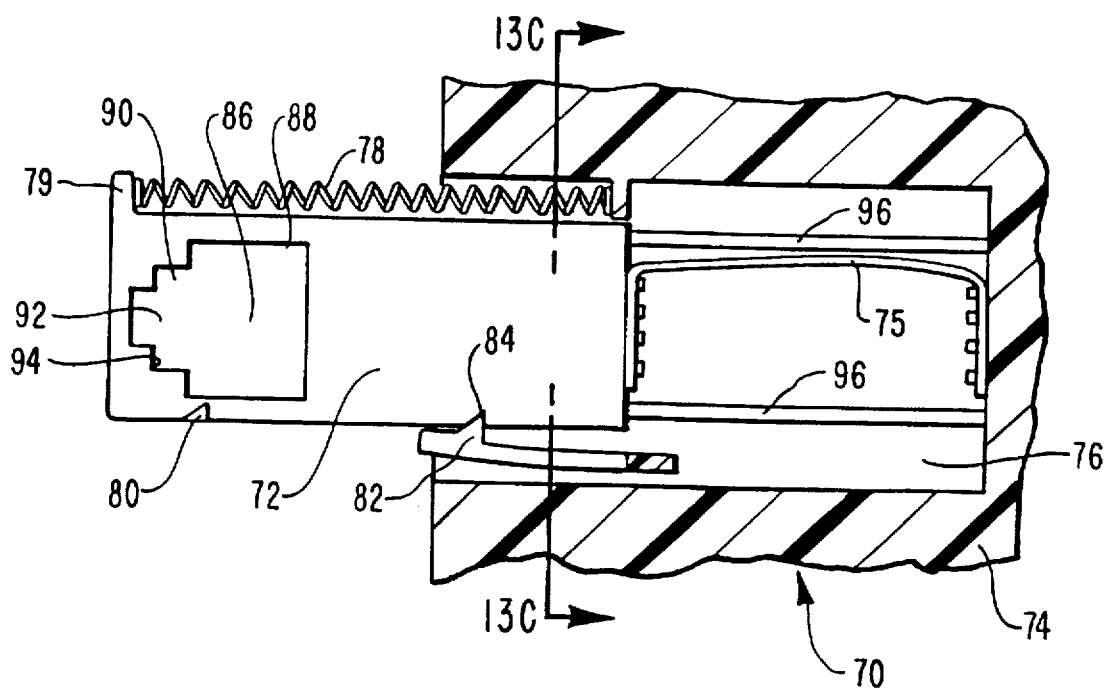
FIG. 12 is a plan view of a first embodiment of an thin-architecture communications card within the scope of the present invention wherein the card is extended ready for insertion by a connector.

FIG. 12 shows an enlargement of one embodiment where aperture block 72 is retractable into fixed portion 74. Fixed portion 74 is in electrical communication with a computer (not shown). Retractable aperture block 72 is in electrical communication with fixed portion 74 through a flexible wire ribbon 75. Retractable aperture block 72 slides in and out of a slot 76 formed within communications card 70. Retractable aperture block 72 is urged out of slot 76 by a spring 78.

According to one aspect of the present invention, the communications card such as illustrated in FIG. 12 is provided with means for biasing the retractable aperture block of the communications card in a direction external to the computer housing.

By way of example and not limitation, the biasing means of the embodiment illustrated in FIG. 12 comprise spring 78 and at least one spring ramp 79. A retention notch 80 in combination with a biased lever 82 retains retractable aperture block 72 within the housing of the computer.

According to another aspect of the present invention, the communications card such as is illustrated in FIG. 12 is provided with means for selectively retaining the retractable aperture block of the communications card within the computer housing.

By way of example and not limitation, the selective retention means of the embodiment illustrated in FIG. 12 comprise retention notch 80 and biased lever 82. A limiting notch 84 is engaged by biased lever 82 when the communications card is extended from the computer housing.

According to still another aspect of the present invention, a communications card such as the communications card illustrated in FIG. 12 is provided with means for restricting the travel of the retractable aperture block of the communications card to a predetermined distance.

By way of example and not limitation, the travel restricting means of the embodiment illustrated in FIG. 12 comprise biased lever 82 and limiting notch 84. Biased lever 82 serves as an actuating mechanism to initiate exposure or retraction of the retractable aperture block of the communications card.

By way of example and not limitation, an aperture 86 having a plurality of walls 88 is formed within retractable aperture block 72. Aperture 86 is so sized and shaped as to be capable of receiving a physical/electrical media connector. Within aperture 86 is formed a broad retention clip groove 90, a narrow retention clip groove 92, and a retention ridge 94. The structures within aperture 86 provide for the retention of a connector pin block of a physical/electrical media connector. A guide track 96 is formed within communications card 70 protruding upwardly from the bottom of communications card 70. Guide track 96 is inter-engaged with a corresponding guide groove formed in the bottom of retractable aperture block 72.

When a user wishes to connect a telephone line to the communications card, biased lever 82 is manipulated out of retention notch 80. As retractable aperture block 72 is released from the grip of biased lever 82, tension applied by spring 78 urges retractable aperture block 72 out of slot 76. The progress of retractable aperture block 72 is guided by guide track 96 and is halted when biased lever 82 engages limiting notch 84. A user then inserts a physical/electrical media connector into aperture 86 to provide an electrical connection between communications card 70 and the telephone line.

According to one aspect of the present invention a communications card such as communications card 70 provides means for biasing the retractable aperture block of the communications card in a direction away from the computer housing.

By way of example and not limitation, the biasing means employed in the embodiment illustrated in FIG. 12 comprise sprung wire 78. When a user no longer wishes access to aperture block 72, the user merely presses retractable aperture block 72 back within the confines of the computer housing such that retention notch 80 will be engaged by biased lever 82 to prevent inadvertent exposure of retractable aperture block 72 outside of the computer housing.

According to another feature of the present invention a communications card such as communications card 70 is provided with means for selectively retaining the retractable aperture block of the communications card within a computer housing. By way of example and not limitation, the selective retention means at the embodiment illustrated in FIG. 12 comprise retention notch 80 and biased lever 82.

After use, the physical/electrical media connector is removed from aperture 86, and biased lever 82 is removed from limiting notch 84. Pressure opposing spring 78 is then applied until biased lever 82 engages retention notch 80. Engagement of biased lever 82 into retention notch 80 secures the communications card within the housing of the computer, thereby protecting the communications card from breakage during transport of the computer. Direct connection of a physical/electrical media connector to the communications card eliminates the need for an external DAA and also eliminates the need for an enclosed physical/electrical media connector socket.

According to one aspect or the present invention, a thin-architecture communications card such as the communications card illustrated in FIG. 12 is provided with means for maintaining electrical communication between the retractable aperture block of the communications card and the fixed remainder of the communications card as the retractable aperture block of the communications card travels in and out of the computer housing.

By way of example and not limitation, the electrical communication maintenance means of the embodiment illustrated in FIG. 12 comprise flexible wire ribbon 75. Flexible wire ribbon 75 is connected at one end both physically and electrically to communications card 70. The other end of flexible wire ribbon 75 is connected both physically and electrically to aperture block 72.

Figure 13A:
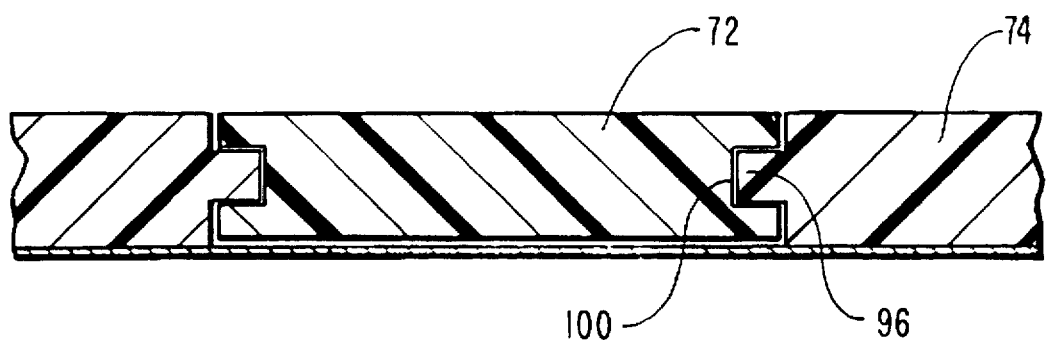
FIG. 13a is a cross-sectional view of a retractable aperture block of a communications card of the present invention and mounted in a remainder of the communications card.

FIG. 13a illustrates retractable aperture block 72 of thin-architecture communications card 70 interengaged with fixed portion 74 through the interaction of guide track 96 with guide channel 100.

Figure 13B:
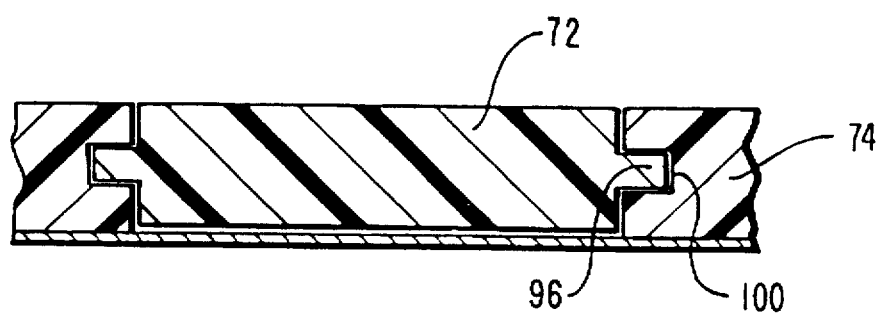
FIG. 13b is a second embodiment of a retractable aperture block such as that illustrated in FIG. 13a also mounted in a thin-architecture communications card.
Figure 13C:
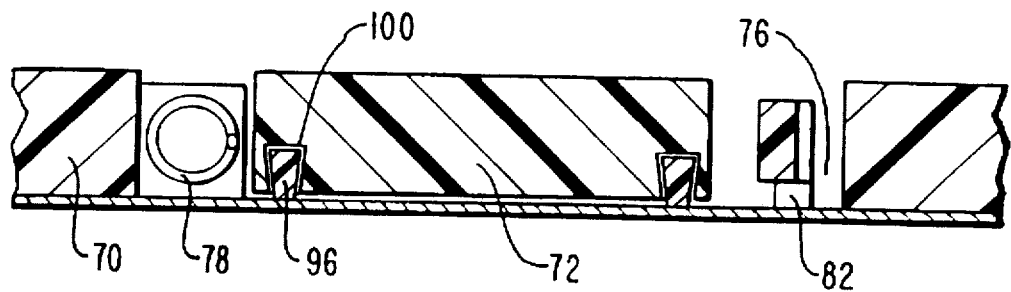
FIG. 13c is a cross-section of the communications card taken along lines 13c—13c in FIG. 12.

According to one aspect of the present invention, a communications card such as communications card 70 illustrated in FIGS. 13a–c provides means for guiding the travel of the retractable aperture block of the communications card as the retractable aperture block of the communications card travels in and out of the computer housing.

By way of example and not limitation, the guiding means of the embodiment illustrated in FIGS. 13a–c comprise guide channel 100 and guide track 96. When access to retractable aperture block 72 is required, the user manipulates retractable aperture block 72 through a slot in the housing in the computer guided by guide track 96 and guide channel 100.

FIG. 13b illustrates an alternate-embodiment of the guiding means illustrated in 13a, wherein the guide track 96 and guide channel 100 are reversed such that guide track 96 is formed in fixed portion 74 and guide channel 100 is formed in aperture block 72.

FIG. 13c is a cross-sectional view taken along lines 13c—13c of FIG. 12 illustrating the interaction of retractable aperture block 72 with communications card 70. Retractable aperture block 72 is shown having guide channel 100 through which guide track 96 slides when aperture block 72 is urged out of slot 76 by spring 78. Guide track 96 is formed on the bottom of thin-architecture communications card 70 protruding upward whereas guide channel 100 is formed in the bottom of retractable aperture block 72.

Figure 14:
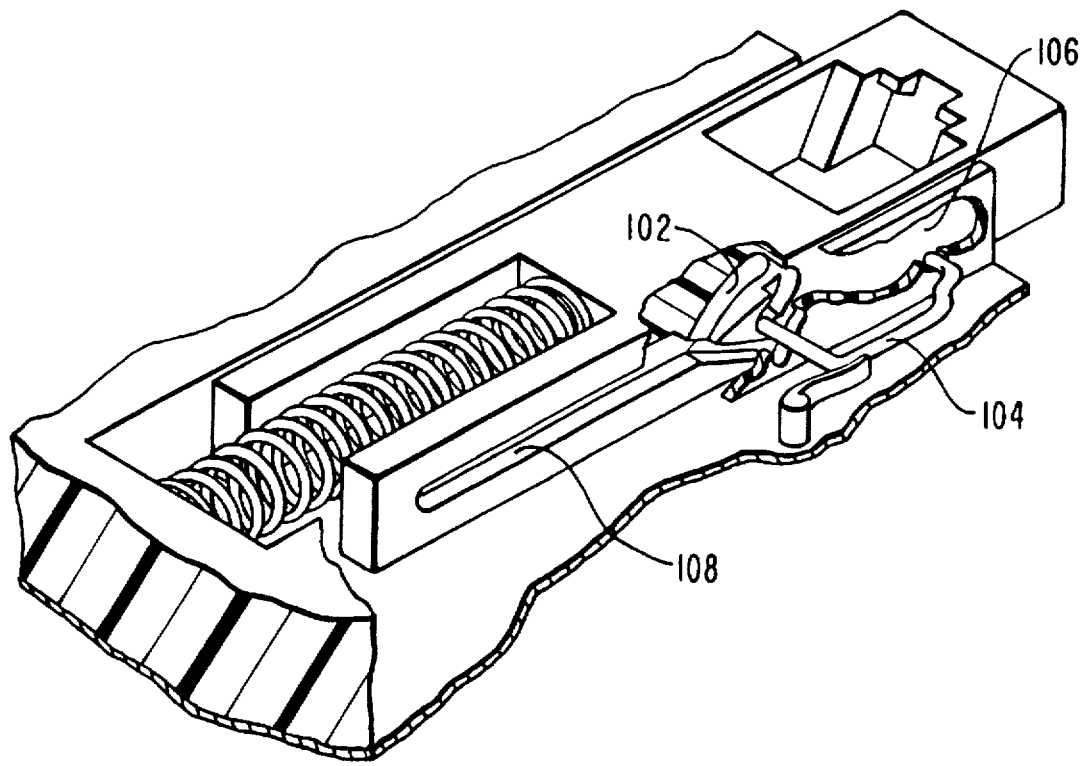
FIG. 14 is a partially cut away perspective view of a retractable aperture block of a communications card shown mounted within a remaining portion of a communications card.

FIG. 14 illustrates an alternate embodiment of the present invention incorporating a ratcheted groove 102 through which an actuating shaft 104 travels during exposure and retraction of aperture block 72.

In operation, travel of the retractable aperture block out of the computer results in travel of actuating shaft 104 progressing through chevron-shaped ratcheted groove 102. Indentations formed within the groove impart a ratcheting action preventing movement of actuating shaft 104 in a retrograde or counter-clockwise motion.

As retractable aperture block 72 is exposed outside of the computer housing, actuating shaft 104 is forced along a linear extended pathway 108 until reaching the end thereof. Further travel of retractable aperture block 72 is halted by contact between actuating shaft 104 and the end of linear extended pathway 108. When a user no longer requires exposure of retractable aperture block 72, retractable aperture block 72 may be manually reinserted through slot 76 until actuating shaft 104 leaves linear extended pathway 108 and continues in a clockwise motion through the chevron-shaped ratcheted groove 102.

According to another aspect of the present invention, a communications card such as communications card 70 illustrated in FIG. 14 provides means for selectively retaining the retractable aperture block of the communications card within the computer housing. By way of example and not limitation, the selective retention means of the embodiment illustrated in FIG. 14 comprise ratcheted groove 102, actuating shaft 104, and linear extended pathway 108.

Figure 15:
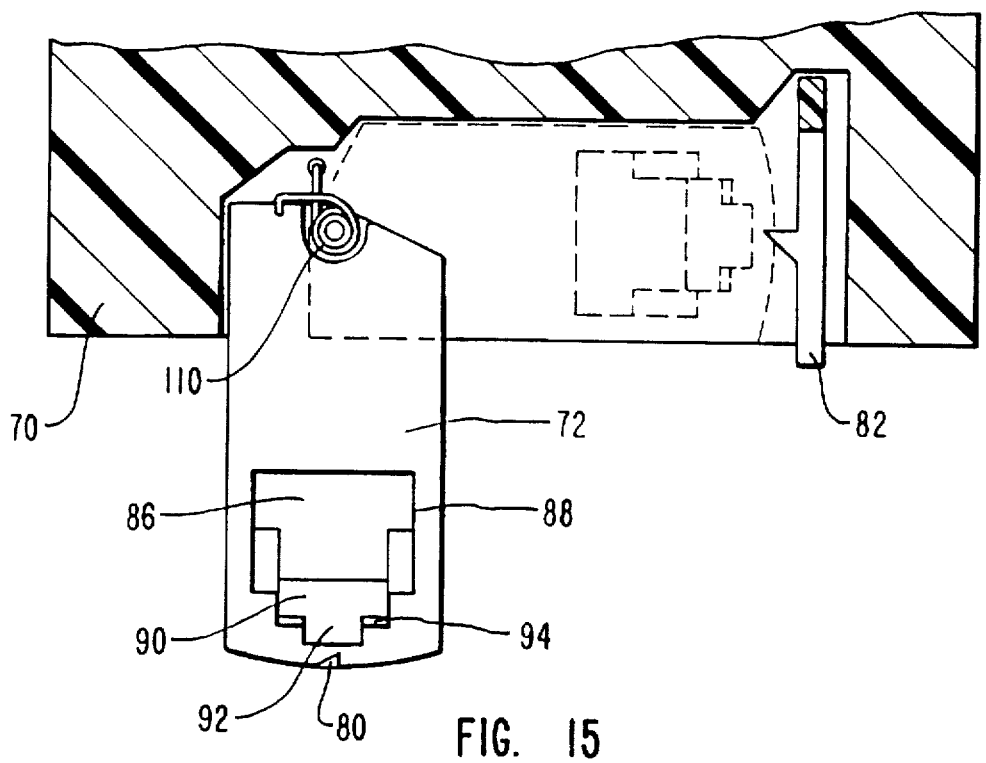
FIG. 15 is a plan of an thin-architecture communications card with an aperture block capable of being retracted wholly within the housing of the computer.

FIG. 15 illustrates an alternate embodiment of the communications card employing the teachings of the present invention. Retractable aperture block 72 is exposed from the computer housing through the use of a sprung wire 110.

According to another aspect of the present invention a communications card such as communications card 70 provides means for biasing the retractable aperture block of the communications card in a direction out of the computer housing. By way of example and not limitation, the biasing means employed in the embodiment illustrated in FIG. 15 comprise sprung wire 110. When a user no longer wishes access to retractable aperture block 72, the user merely presses aperture block 72 back within the confines of the computer housing such that retention notch 80 will be engaged by biased lever 82 to prevent inadvertent exposure of retractable aperture block 72 outside of the computer housing.

According to another feature of the present invention a communications card such as communications card 70 is provided with means for selectively retaining the retractable aperture block of the communications cad within a computer housing. By way of example and not limitation, the selective retention means of the embodiment illustrated in FIG. 15 comprise retention notch 80 and biased lever 82.

Figure 16:
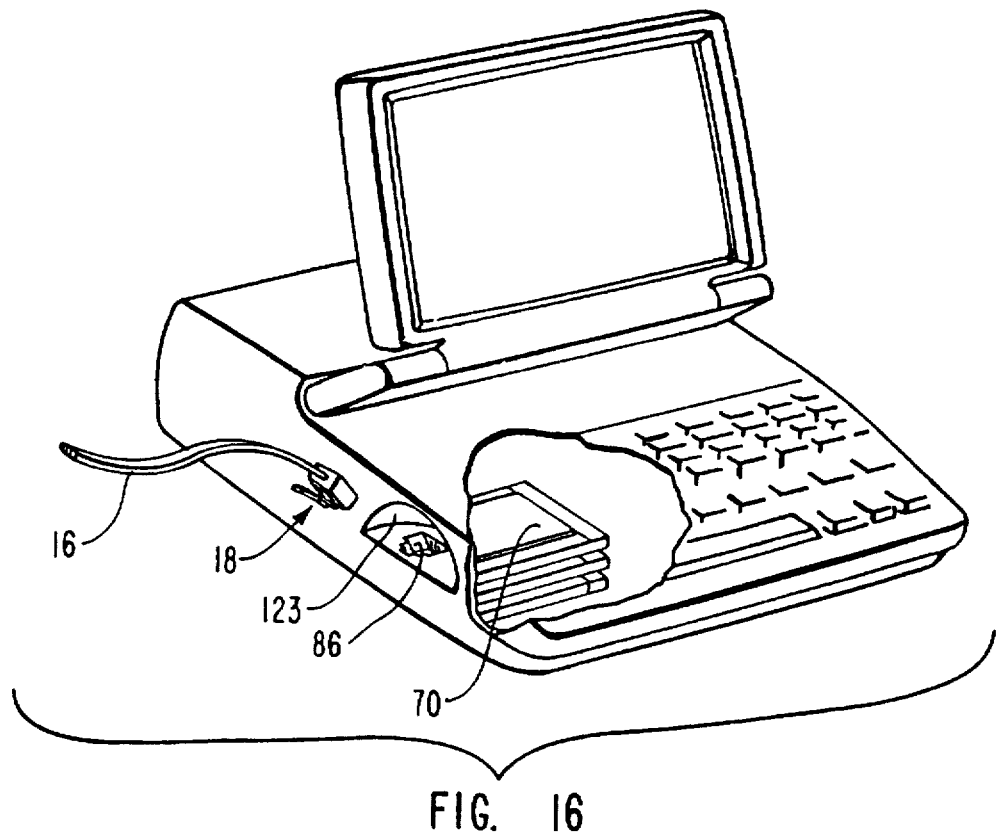
FIG. 16 is a perspective view of a computer housing formed so as to reveal the communications card installed therein.

FIG. 16 depicts the computer housing having formed therein an access tunnel 123. Access tunnel 123 allows direct access to communications card 70 from outside of the computer without the need to move communications card 70. Media connector 18 is inserted through access tunnel 123 directly into communications card 70 to provide a physical and electrical connection between the computer and telephone line 16.

Figure 17:
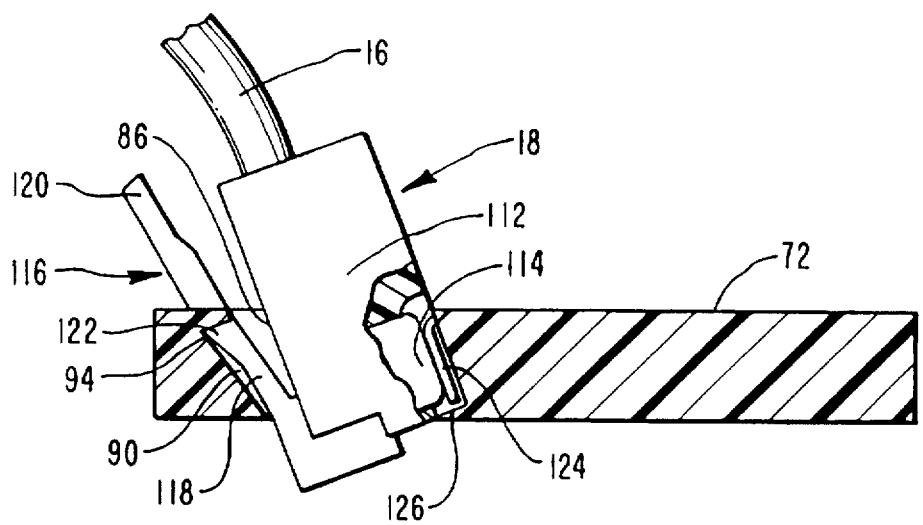
FIG. 17 is a partially broken-away cross-sectional view of an aperture block of an thin-architecture communications card having a physical/electrical media connector inserted therein.

FIG. 17 depicts an inventive interface between a physical/electrical media connector 38 and aperture block 72. The aperture block may be retractable or detachable, or may be formed within the communications card itself, and is not a limitation in this, or the subsequent embodiments discussed. Physical/electrical media connector 38 comprises a contact pin block 112, a plurality of contact pins 114, and a biased retention clip 116. The biased retention clip comprises a broad fixed end 118, a narrow free end 120, and a transition notch 122. Upon insertion of physical/electrical media connector 38 electrical connection is made between a telephone line 16 and aperture block 72.

The communications card in FIG. 17 may also be provided with means for preventing passage of the contact pin block completely through the aperture in the communications card. By way of example, the passage prevention means of the embodiment illustrated in FIG. 17 comprise a ledge 126.

Figure 18:
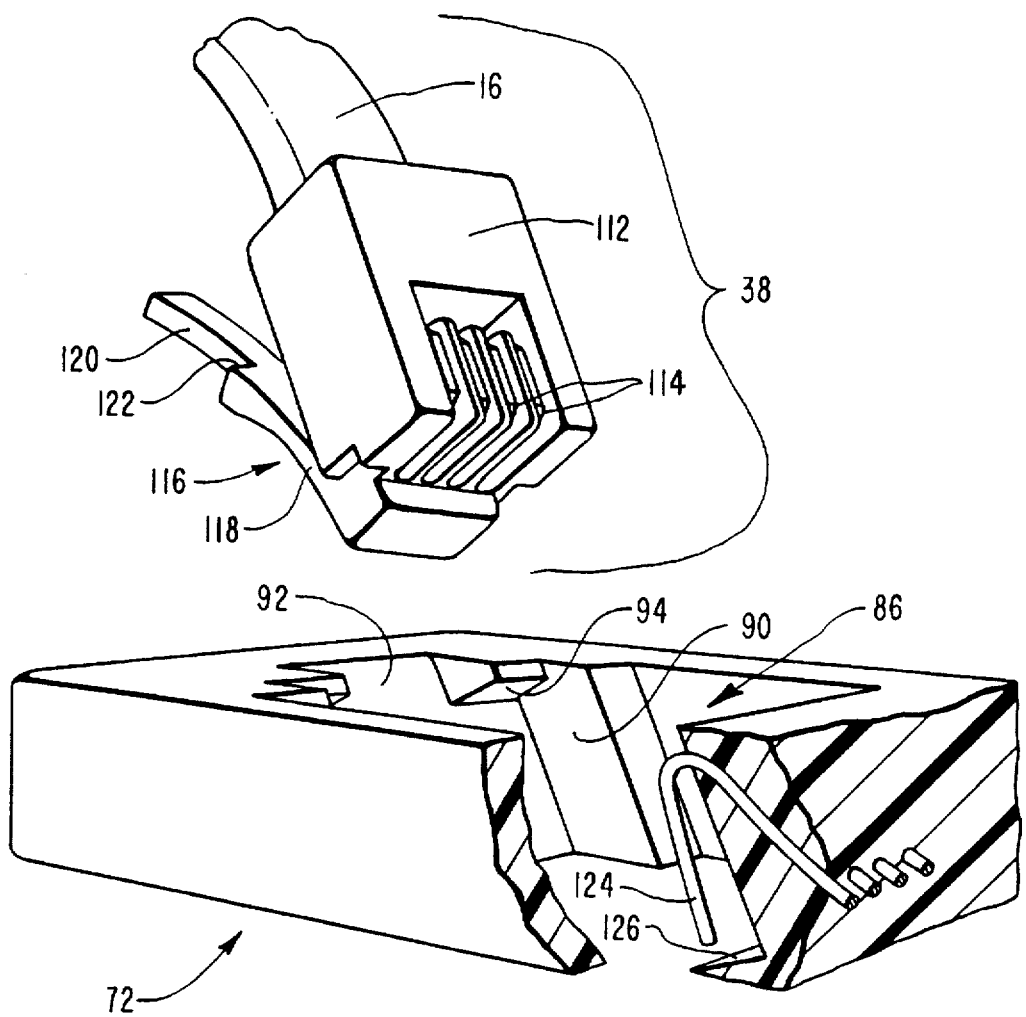
FIG. 18 is a partially broken away perspective view of an aperture block of an thin-architecture communications card having a physical/electrical media connector disconnected therefrom.

FIG. 18 illustrates a conventional RJ-11 plug 38 located near aperture block 72 of communications card 70. When inserted, RJ-11 plug 38 initiates electrical connection between contact wires 124 and contact pins 114 to allow the transfer of data from telephone line 16 to the computer. Ledge 126 prevents passage of RJ-11 plug 38 entirely through aperture block 72 of communications card 70.

The physical connection of RJ-11 plug 38 into angled aperture 86 is guided by the insertion of broad fixed end 118 into broad retention clip groove 90 of angled aperture 86. Progress of broad fixed end 118 through broad retention clip groove 90 are not impeded. However, once narrow free end 120 of biased retention clip 116 is pressed beyond retention ridge 94, RJ-11 plug 38 is locked within angled aperture 86. To release RJ-11 plug 38 from angled aperture 86, a user merely presses biased retention clip 116 at narrow free end 120 toward contact pin block 112 and withdraws RJ-11 plug 38 from angled aperture 86. Transition notch 122 interacts with retention ridge 94 to lock RJ-11 plug 38 into angled aperture 86 when engaged.

It will be appreciated that the function of angled aperture 86 mirrors closely the function of an enclosed RJ-11 socket without violating the constraints of the thin-architecture communications card. The angle at which angled aperture 86 is formed within this embodiment in aperture block 72 is thus limited by the restrictions imposed by the thin-architecture.

Figure 19:
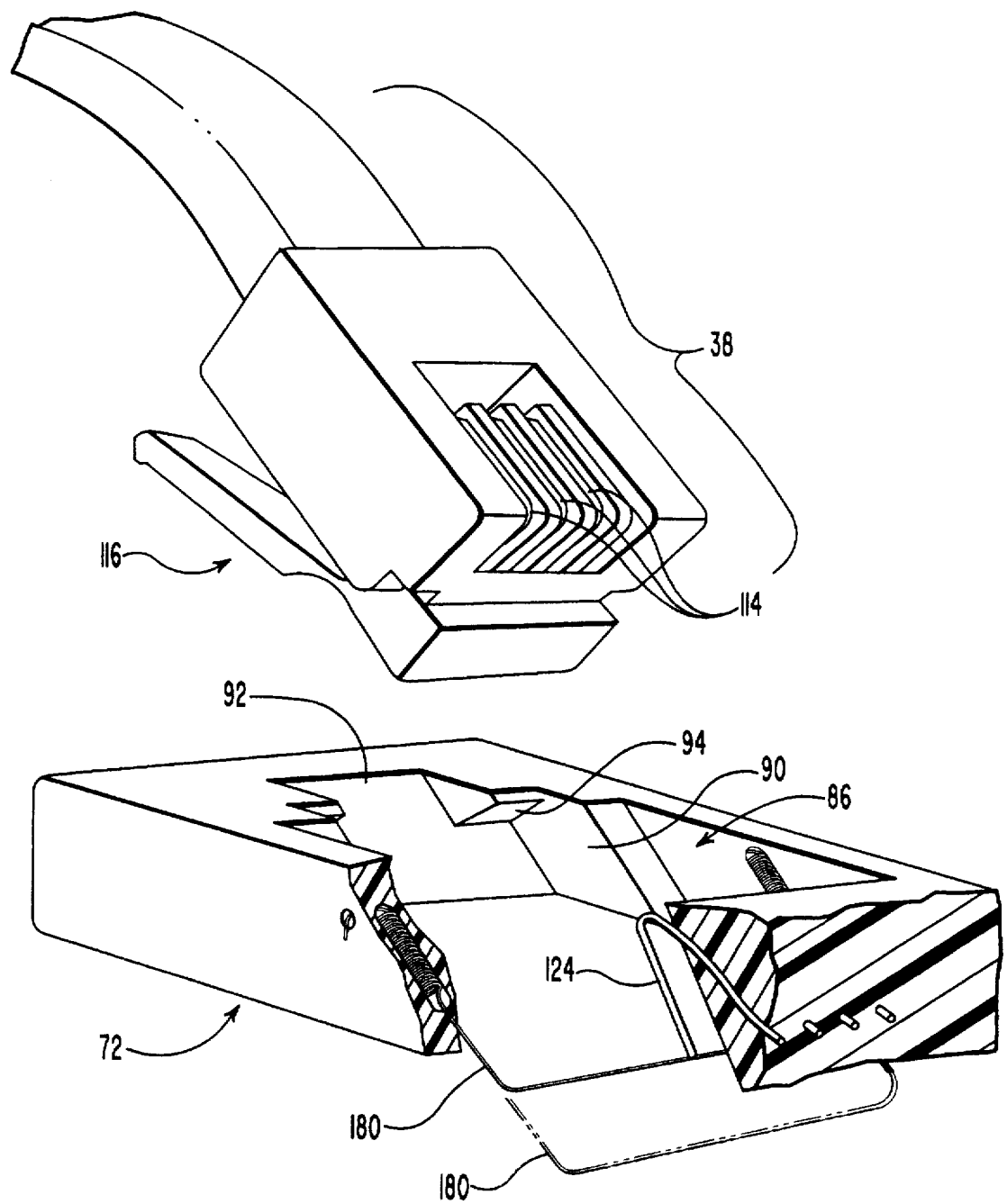
FIG. 19 is partially broken away perspective view of an embodiment of the aperture block of a thin architecture communications card having a physical/electrical media connector disconnected therefrom.

FIG. 19 illustrates another embodiment incorporating the teachings of the present invention. The embodiment illustrated in FIG. 19 employs an angled aperture 86. In this embodiment, physical/electrical media connector 38 is inserted into the angled aperture 86. Retention structure 180 is mechanically biased to exert a force opposing the insertion of the physical/electrical media connector 38.

In this embodiment, retention structure 180 serves a dual function. In one sense, retention structure 180 serves to prevent the physical/electrical media connector 38 from passing completely through aperture 86. Thus, the retention structure serves as an example of one embodiment of the means to prevent passage of the physical/electrical media connector through aperture 86. In another sense, retention structure 180 opposes the insertion of media connector 38. The retention structure thus serves to ensure that biased retention clip 116 is retained in retention ridge 94 and at least one contact pin 114 is electrically connection to at least one contact wire 124.

It will be appreciated that by utilizing a retention structure such as that illustrated in the embodiment depicted in FIG. 19, the angle at which the angled aperture 86 is formed within a thin-architecture is not confined to angles which allow capture of both ends of the physical/electrical media connector 38. Thus the angle of the aperture in the embodiment illustrated in FIG. 19 is not limited by restrictions imposed by the thin-architecture communications card such as in the embodiments illustrated in FIGS. 17 and 18.

In FIG. 19, the phantom lines of retention structure 180 show the position of retention structure 180 when a physical/electrical media connector 38 is inserted into aperture 86. The solid lines illustrate the normal state of repose of retention structure 180.

Figure 20:
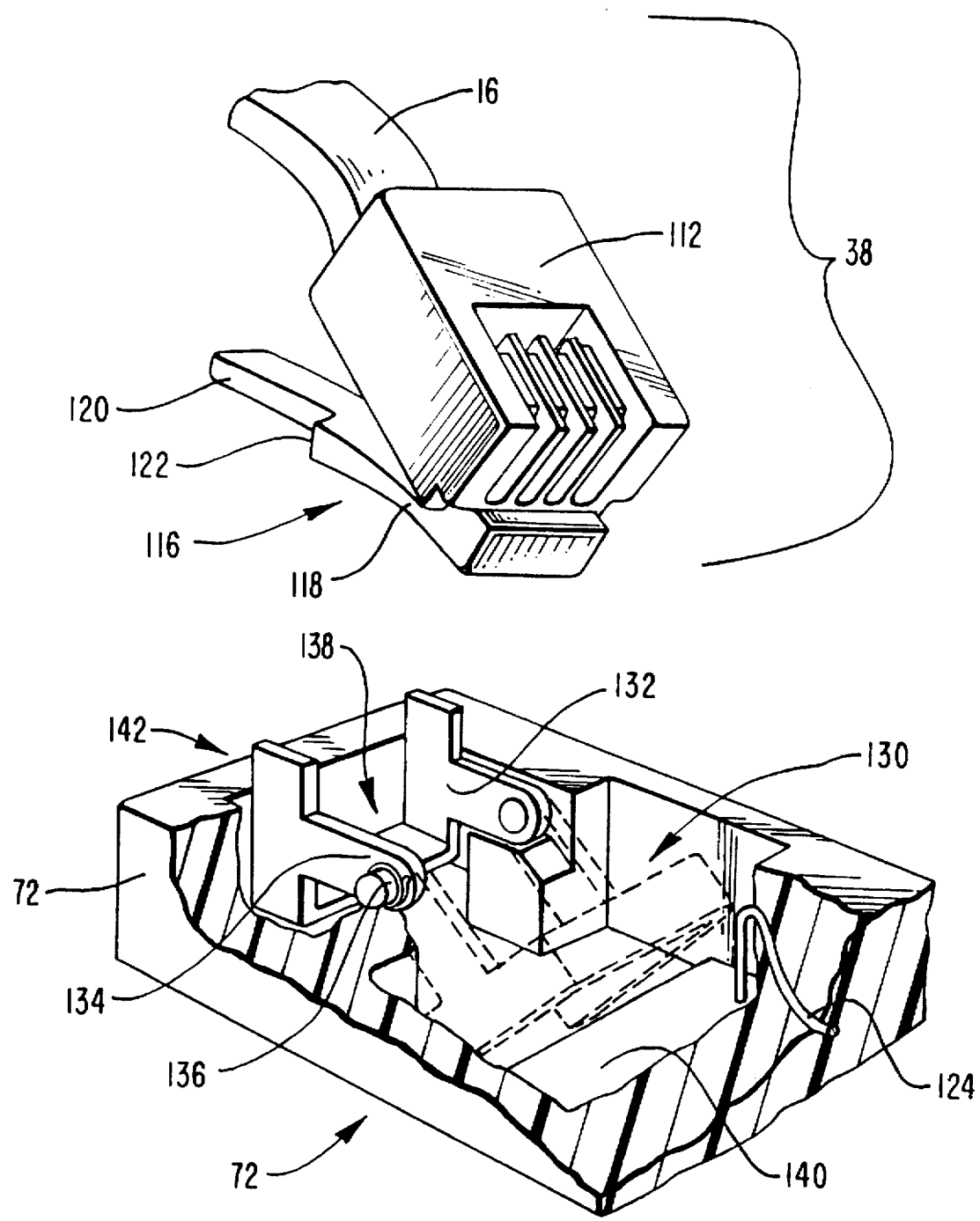
FIG. 20 is a partially broken away perspective view of another embodiment of an interface between a physical/electrical media connector and a thin-architecture communications card incorporating the teachings of the present invention.

FIG. 20 illustrates yet another embodiment of the present invention. The embodiment illustrated in FIG. 20 does not employ an angled aperture, but instead utilizes a perpendicular aperture 130 formed within aperture block 72 of communications card 40. Such an arrangement requires that additional structures be incorporated into the communications card to either capture retention clip 116 as the clip protrudes above the surface of the communications card or to support the lower end of pin block 112 if it protrudes below the surface of the communications card. Because of the limitations imposed by a thin-architecture standard, the 8–15 mm connector must protrude from at least one surface of the communications card when inserted in a perpendicular orientation relative to the surface of that card.

According to one aspect of the invention, therefore, an aperture, such as the aperture illustrated in FIG. 20 is provided with means for securing the physical/electrical connector within the aperture in the communications card. By way of example and not limitation, the securing means of the embodiment illustrated in FIG. 20 comprise biased retention stirrup 132. Stirrup 132 is pivotally biased by a stirrup spring 134 about the longitudinal axis of a pivot pin 136. Stirrup spring 134 biases stirrup 132 by way of example in a clockwise direction in the embodiment illustrated in FIG. 20. The natural state of repose for stirrup 132 is shown in phantom lines.

When use of perpendicular aperture 130 is desired, stirrup 132 is pivoted out of aperture 130 into a recess 138 thereby removing any obstruction to plug 38 as plug 38 is inserted into aperture 130. In the embodiment illustrated in FIG. 20, travel of plug 38 through aperture 130 is limited by a stop 140 which protrudes into aperture 130. Upon abutment of plug 38 with stop 140, stirrup 132 may be released to pivot under urging from spring 134 into contact with the portion of plug 38 protruding from the upper surface of aperture block 72. Stirrup 132 is configured so as to have a retention tab 142 projecting from stirrup 132 so as to be capable of engaging transition notch 122 when plug 38 is abutting stop 140 in aperture 130. Spring 134 maintains engagement of retention tabs 142 with transition notch 122 when connection is made between plug 38 and aperture 130.

Figure 21:
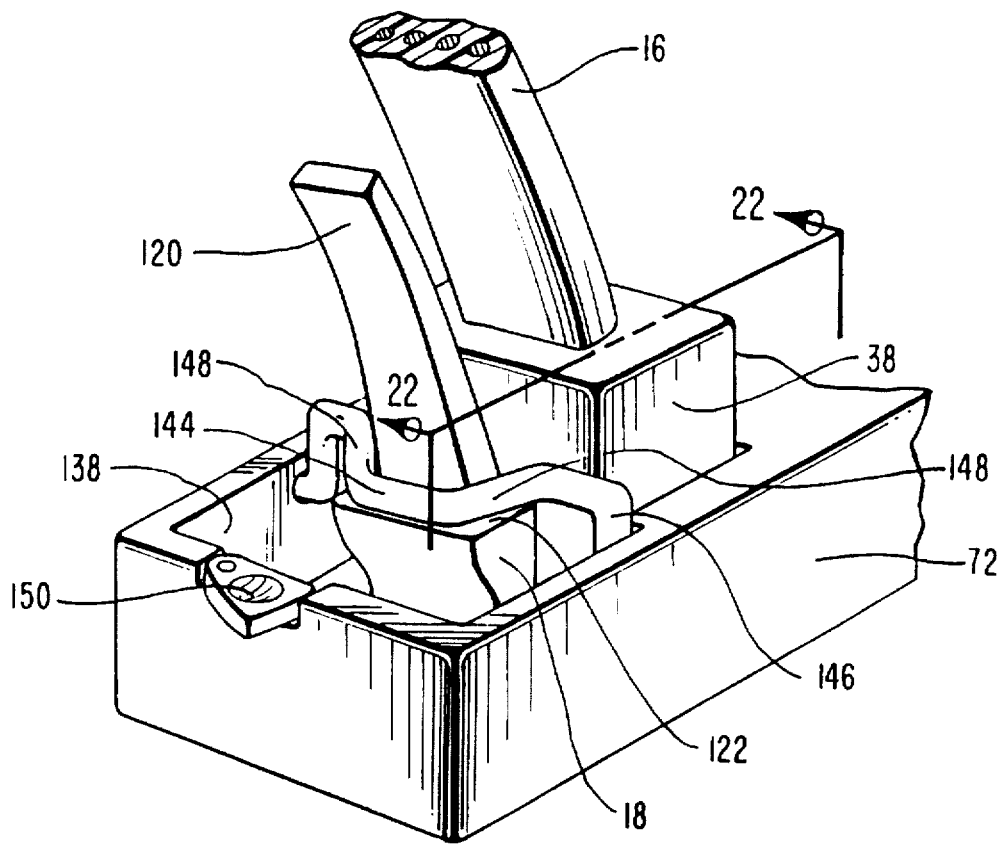
FIG. 21 is a perspective view of the interconnection of the physical/electrical media connector with an aperture block of a communications card.

In the embodiment illustrated in FIG. 21, and according to one aspect of the invention, aperture block 72 illustrated in FIG. 21 is provided with means for securing the physical/electrical connector within the aperture in the communications card. By way of example and not limitation, the securing means of the embodiment illustrated in FIG. 21 comprise a biased biarcuate stirrup 144. Biarcuate stirrup 144 is pivotally biased against plug 38. Retention of plug 38 with aperture 130 is accomplished through the biarcuate shape of biarcuate stirrup 144.

As used in this specification, the term biarcuate describes any stirrup having a depending attachment leg 146 and a retention leg 148, two attachment legs being positioned apart a distance at least as wide as broad fixed end 18, and the retention legs being capable of engaging transition notch 122.

As illustrated in FIG. 21, when biarcuate stirrup 144 is pressed into recess 138, tension produced by stirrup spring 134 urges biarcuate stirrup 144 into aperture 130. While biarcuate stirrup 144 may be manipulated out of aperture 130 prior to use, it is preferable to have biarcuate stirrup housed so as not to block entry of plug 38 into aperture 130.

According to one aspect of the invention, a stirrup such as the stirrup illustrated in FIG. 21 is provided with means for selectively restraining a stirrup from obstructing the aperture. By way of example and not limitation, the restraining means illustrated in FIG. 21 comprise a locking disk 150. Locking disk 150 selectively engages a stirrup such as biarcuate stirrup 144 to prevent pivoting of biarcuate stirrup 144 into an aperture such as aperture 130.

Figure 22:
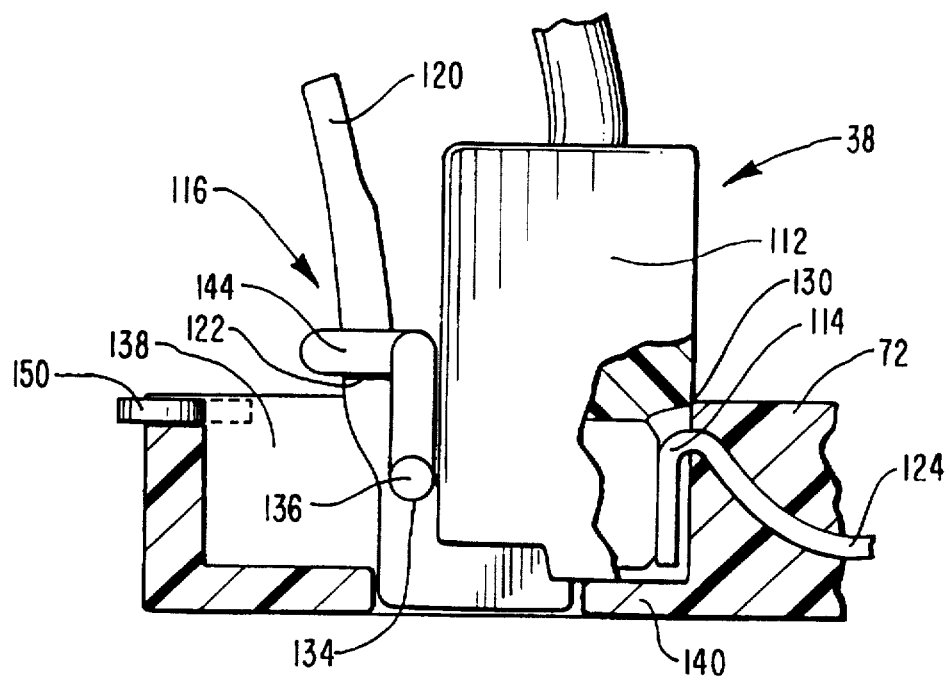
FIG. 22 is a cross-sectional view taken along lines 22—22 in FIG. 21 further illustrating the inventive interface.

FIG. 22 is a cross-sectional view taken along lines 22—22 in FIG. 21 illustrating more specifically the interaction between aperture 130 and plug 38. Biarcuate stirrup 144 is shown engaged with transition notch 122 of biased retention clip 116. Tension produced between biased retention clip 116 and stirrup spring 134 via biarcuate stirrup 144 maintains the engagement of biarcuate stirrup 144 with transition notch 122. When plug 38 is to be withdrawn from aperture 130, a user disengages biarcuate stirrup 144 from transition notch 122 by pressing biarcuate stirrup 144 into recess 138 while withdrawing plug 38 from abutment with stop 140 in aperture 130. When plug 38 is not within aperture 130, biarcuate stirrup 144 will be biased by stirrup spring 134 into aperture 130.

Aperture 130 is positioned within aperture block 72 to allow electrical contact between contact wires 124 and the plurality of electrical contact pins 114 located in contact pin block 112. Locking disk 150 selectively engages biarcuate stirrup 144 to prevent pivoting of biarcuate stirrup 144 into aperture 130.

Figure 23:
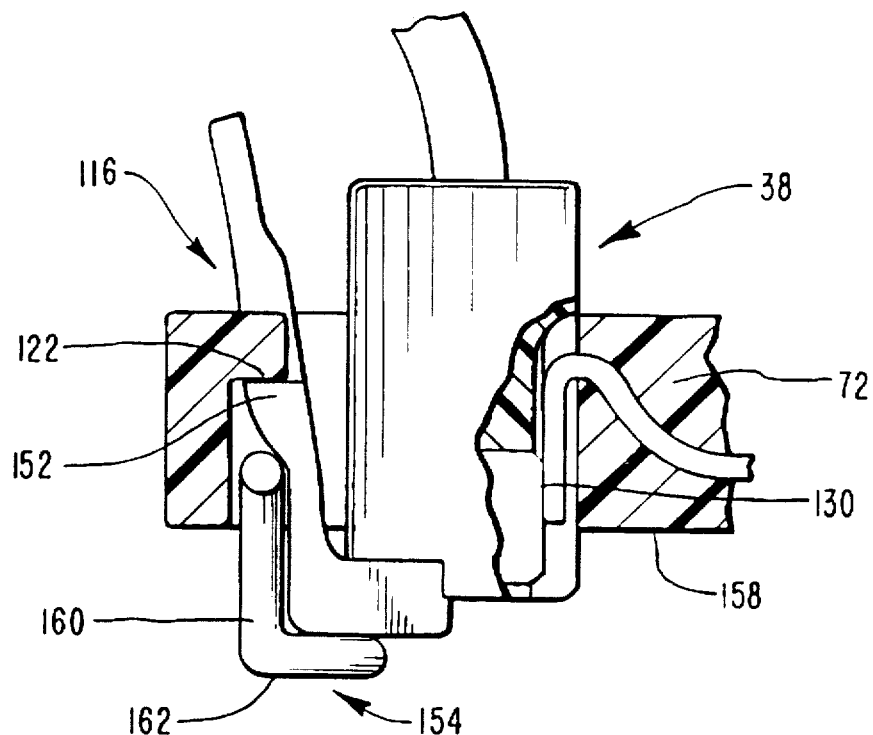
FIG. 23 is a cross-sectional view of an embodiment of an interface incorporating the teachings of the present invention.

FIG. 23 illustrates an aperture block 72 of a communications card having formed therein perpendicular aperture 130 as illustrated in FIG. 22. The embodiment of the present invention illustrated in FIG. 23 differs from that in FIG. 22 in that plug 38 is not stopped by a protrusion from the wall of aperture 130, but is instead allowed to pass partially through aperture block 72. Partial passage of plug 38 through aperture block 72 allows transition notch 122 of biased retention clip 116 to be engaged by a perpendicular retention ridge 152 formed within aperture 130.

To prevent passage of plug 38 completely through aperture 130, and according to one aspect of the invention, an aperture block of a communications card like that illustrated in FIG. 23 is provided with means for preventing passage of the plug completely through the aperture. By way of example and not limitation, the passage prevention means of the embodiment illustrated in FIG. 23 comprise a pivot amp 154. Pivot arm 154 is biased into aperture 130 by a pivot arm spring 156.

As plug 38 is introduced into aperture 130, plug 38 forces pivot arm 154 out of aperture 130 into a position below and perpendicular to a lower than 158 of aperture block 72. In this perpendicular position illustrated in FIG. 23, a depending arm 160 of pivot arm 154 is perpendicular to face 158. An abutment arm 162 protrudes perpendicular to depending arm 160. As pivot arm 154 is pressed out of aperture 130 by plug 38, the progress of plug 38 is halted upon abutment with abutment arm 162. At the point of abutment, transition notch 122 will be engaged by retention ridge 152 thereby securing plug 38 in aperture 130. Electrical contact between the plurality of contact pins 114 and contact wires 124 will also occur at this point.

To remove plug 38 from aperture 130, a user presses biased retention clip 116 against contact pin block 112 and pulls plug 38 out of aperture 130.

Figure 24:
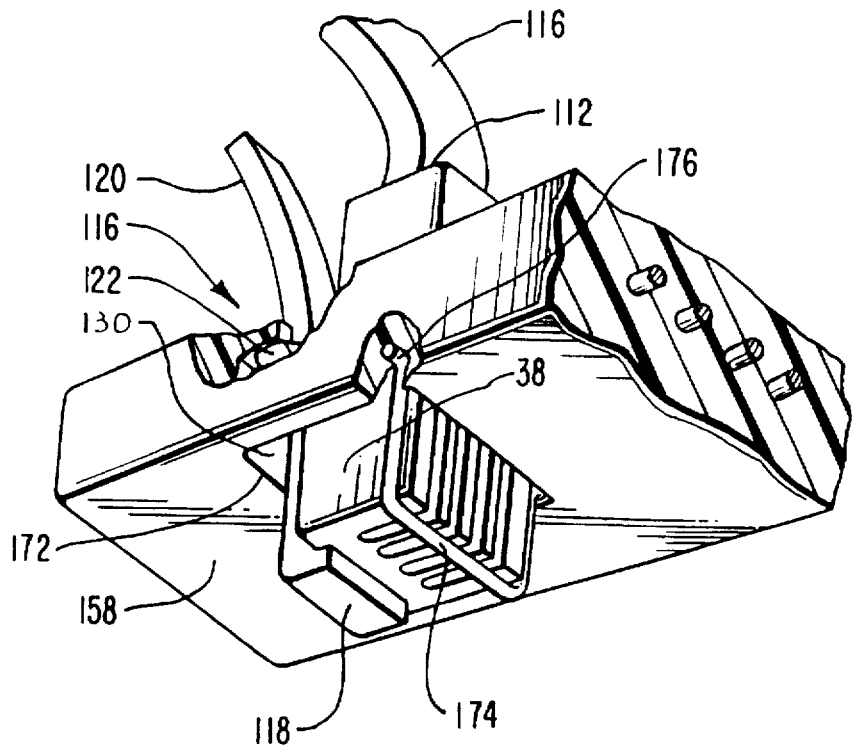
FIG. 24 is a perspective view of an embodiment of an interface incorporating the teachings of the present invention.

FIG. 24 illustrates another embodiment of the present invention. Upon introduction of plug 38 into aperture 130, stirrup 174 is pivoted out of an orientation parallel with lower surface 158 into a perpendicular orientation therewith. Upon reaching a depending condition, stirrup 174 prevents further passage of plug 38 through aperture 130. At this point a sufficient portion of plug 38 is extending below surface 158 to allow capture of the transition notch of the bias retention clip by the retention ridge formed in the wall of aperture 130. The sufficient portion of the electrical contacts within plug 38 remain in the aperture 130 to afford electrical communication with the contact wires formed within the retractable aperture block of the communications card.

According to one aspect of the invention, an aperture block of a communications card like that illustrated in FIG. 24 is provided with means for preventing passage of the plug completely through the aperture. By way of example and not limitation, the passage prevention means of the embodiment illustrated in FIG. 24 comprise a pivoting dependant stirrup 174. If the aperture block is retractable, retraction of the aperture block will pivot the stirrup into aperture 130 without the need for a spring. Stirrup 174 may also be biased into the aperture 130 by a spring 176. Spring biasing may be useful where the aperture block is detachable or where the aperture is formed directly in the communications card.

Figure 25:
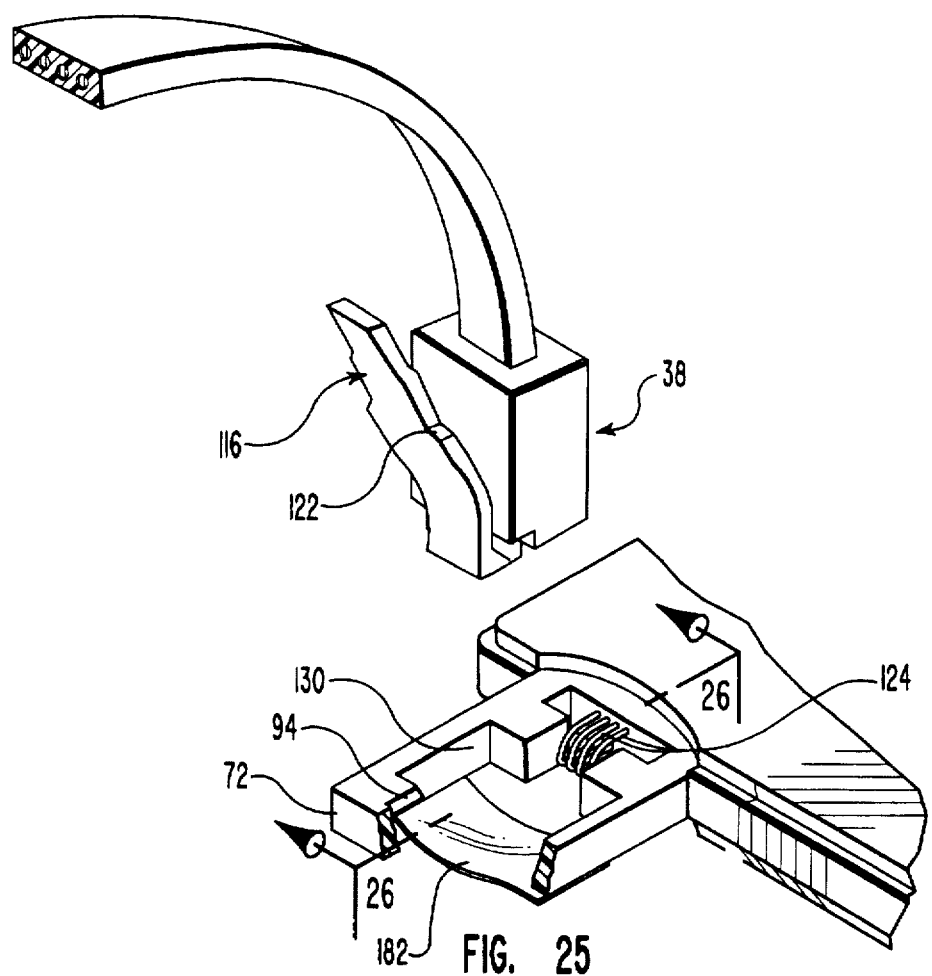
FIG. 25 is a perspective view of another embodiment of an interface incorporating the teachings of the present invention.

FIG. 25 illustrates another embodiment incorporating the teachings of the current invention. In this embodiment a perpendicular aperture 130 is employed. The aperture is formed so that when physical/electrical media connector 38 is inserted into aperture 130, at least one contact pin of physical/electrical media connector 38 is held in electrical contact with at least one contact wire 124.

According to one aspect of the present invention, embodiments may include means for preventing the physical/electrical media connector from passing through the aperture. By way of example and not limitation, in FIG. 25 the means for preventing passage of the plug through the aperture is flexible diaphragm 182. In this embodiment, the flexible diaphragm 182 extends over at least a portion of the bottom of aperture 130. As used in the context of this patent, flexible diaphragm means a flexible membrane that covers at least a portion of aperture 130.

Figure 26:
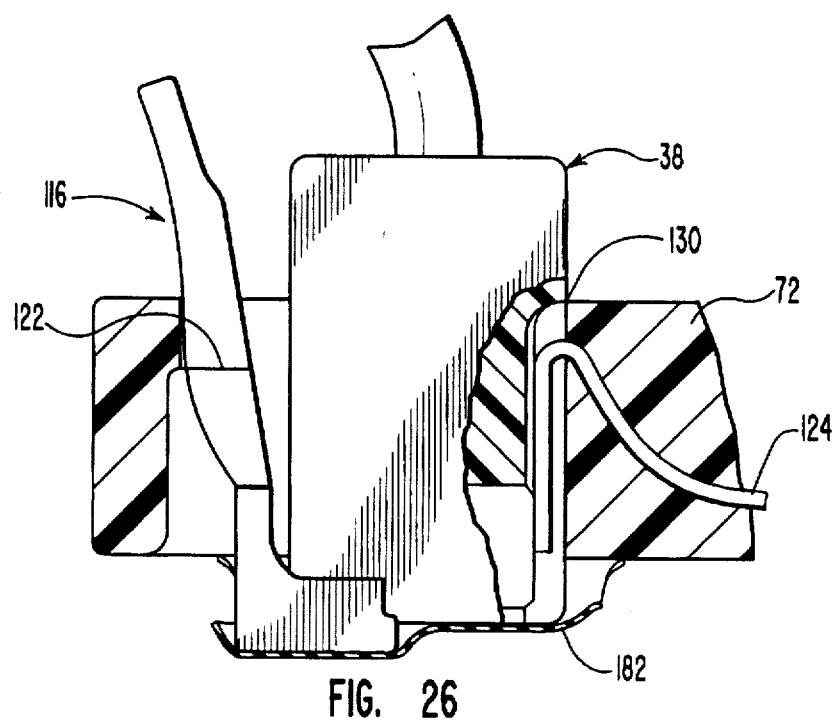
FIG. 26 is a cross-sectional view taken along the lines 26—26 in FIG. 25 further illustrating the inventive interface.

FIG. 26 is a cross-sectional view taken along line 26—26 of FIG. 25 which shows in greater detail the embodiment illustrated in FIG. 25. As physical/electrical media connector 38 is inserted into aperture 130, flexible diaphragm 182 exerts an upward force on media connector 38. The upward force serves to ensure that transition notch 122 is retained by retention ridge 94. It will be appreciated that in accordance with the definition of flexible diaphragm as used in this patent, flexible diaphragm 182 may extend over portion of aperture 130 or completely cover the bottom of aperture 130.

Figure 27:
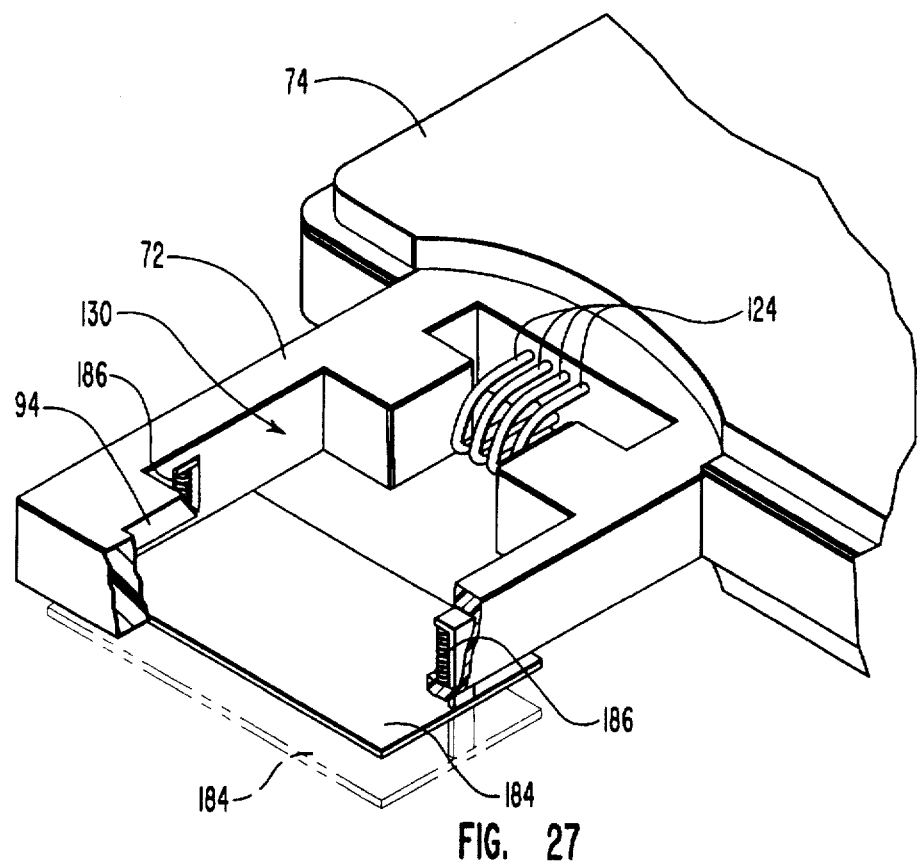
FIG. 27 is a perspective view of yet another embodiment of an interface incorporating the teachings of the present invention.

FIG. 27 illustrates another embodiment of the present invention utilizing the teachings of the present invention. In this embodiment, aperture block 72 is provided with perpendicular aperture 130. As in other the other embodiments illustrated in FIGS. 17–29, aperture block 72 may be detachable from fixed portion 74 or retractable into fixed portion 74. According to one aspect of the present invention, an embodiment may be provided with means to prevent passage of the physical/electrical media connector through the aperture. By way of example and not limitation, in this embodiment the passage prevention means comprise faceplate 184 which is provided across at least a portion of aperture 130. Faceplate 184 is mechanically biased by spring 186. The solid lines of faceplate 184 show the natural state of repose of faceplate 184 while the phantom lines show the state of the faceplate when a physical/electrical media connector pressed into aperture 130.

When a physical/electrical media connector is pressed into aperture 130, faceplate 184 exerts a force opposing insertion of the physical/electrical media connector. The opposing force ensures that the appropriate portion of the physical/electrical media connector is retained by retention ridge 94.

Figure 28:
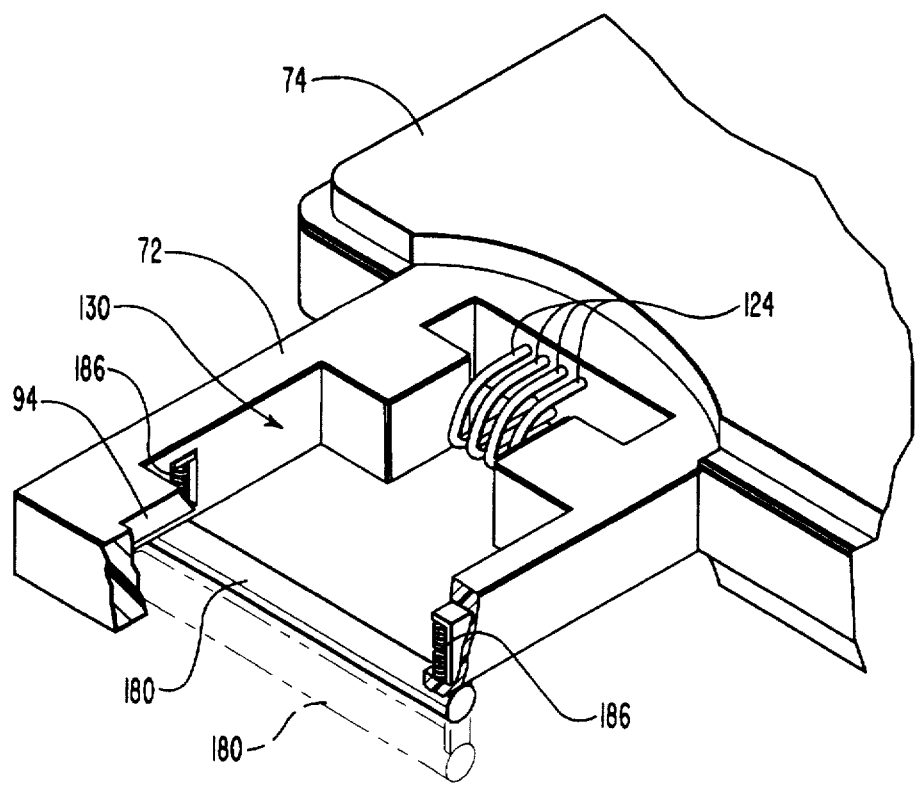
FIG. 28 is a perspective view of another embodiment of an interface incorporating the teachings of the present invention.

Yet another embodiment incorporating the teachings of the present invention is depicted in FIG. 28. This embodiment is provided with perpendicular aperture 130 and with means for preventing the passage of the physical/electrical media connector through aperture 130 in aperture block 72. By way of example and not limitation, in the illustrated embodiment the means for preventing the passage of the physical/electrical media connector through aperture 130 is retention structure 180. Retention structure 180 is mechanically biased by spring 186. The natural state of repose of retention structure 180 is illustrated by solid lines.

When physical/electrical media connector is pressed into aperture 130, mechanically biased retention structure 180 exerts an upward force opposing the insertion of the physical/electrical media connector. The upward force ensures that the media connector will be retained within aperture 130. In FIG. 28, the state of retention structure 180 when a physical/electrical media connector is pressed into aperture 130 is shown by phantom lines.

Figure 29:
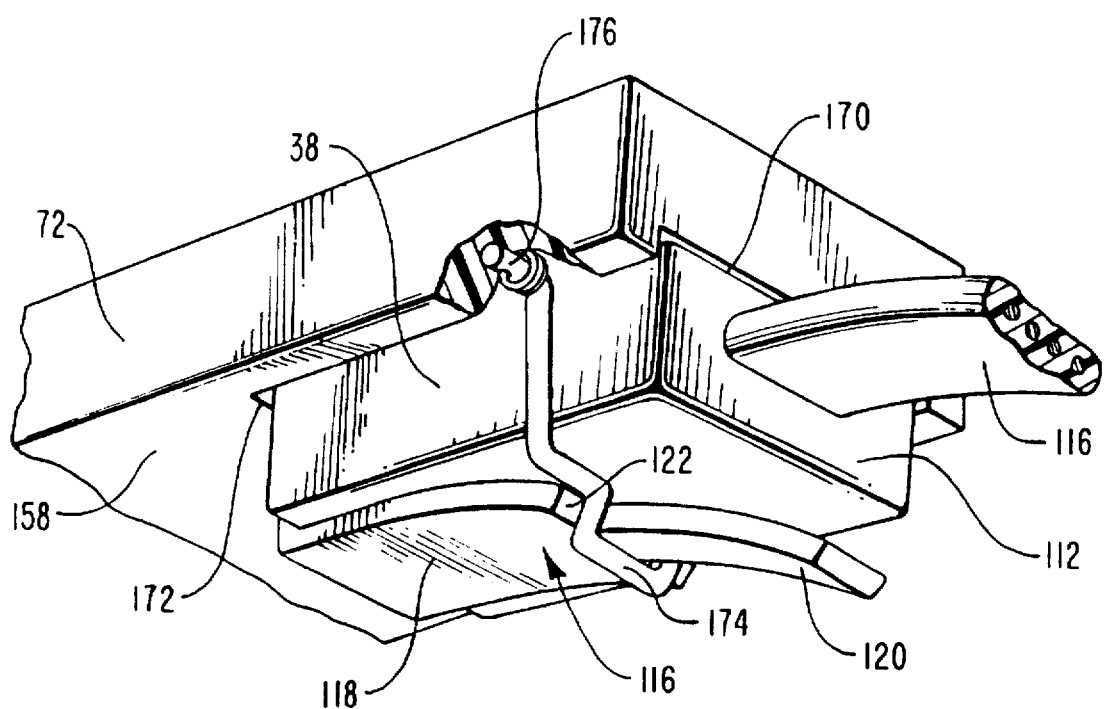
FIG. 29 is a partially broken away perspective view of an embodiment of an interface between a physical/electrical media connector and a thin-architecture communications card incorporating the teachings of the present invention.

FIG. 29 illustrates an embodiment of the present invention utilizing a retention channel with a longitudinal axis parallel with and formed in lower face 158. Retention channel 170 serves to resist lateral movement of plug 38. Channel 170 terminates in an end wall 172 against which plug 38 abuts when fully inserted into channel 170. Plug 38 is held in channel 170 by a support stirrup 174 pivotally attached to aperture block 72. A spring 176 biases support stirrup 174 into channel 170.

In use, support stirrup 174 will be pivoted out of channel 170 and plug 38 will be inserted into support stirrup 174. Plug 38 is inserted into channel 170 until contact pin block 112 abuts end wall 172 whereupon support stirrup 174 engages transition notch 122 of biased retention clip 116.

To disengage plug 38 from channel 170, a user presses biased retention clip 116 toward contact pin block 112 thereby disengaging support stirrup 174 from transition notch 122.

By allowing the direct insertion of conventional RJ-type physical/electrical media connectors into the communications card, the present invention obviates the need for any external podule or other device that must be carried externally in addition to the computer. If a portable computer is to be transported, the telephone line and compatible physical/electrical media connector can be easily disconnected and the communications card may then be retracted into the housing of the computer. Retraction of the communications card prevents breakage and allows portfolios designed to carry the computer to function in a normal manner without the impedance of any apparatus protruding from the side of the computer housing.

As the DAA is built internally into the thin-architecture communications card no external DAA is required. The advantage of having an internal DAA and the ability to directly connect an RJ-11 or other RJ-type physical/electrical media connector are best realized when a user must frequently transport a portable computer between locations.

For embodiments incorporating detachable aperture blocks, significant advantages over current external podules exist. The thin, lightweight nature of the detachable aperture blocks enhance portability of downsized computers. Also, the small nature of the detachable aperture blocks may allow them to be carried in small storage areas built into carrying bags or directly in the downsized computer itself. Finally, the lack of DAA circuitry and enclosed physical/electrical media connector sockets make detachable aperture blocks extremely low cost. Thus, multiple detachable aperture blocks may be provided for the cost of a single podule.

Similar advantages are realized when using the inventive interface in connection with a LAN. Direct insertion of a plug physically compatible with an FCC Part 68, subpart F-specification 8-pin miniature modular plug directly into a thin-architecture communications card obviates the need for any other device that must be used to connect the LAN to the variety of cable being used. By standardizing LANs to an 8-pin miniature modular plug physical/electrical media connector, the advantages of interchangeability and commonality can be realized. Incorporation of a socket capable of receiving an 8-pin miniature modular plug allows for direct connection to a thin-architecture communications card imparting LAN capabilities to laptop and notebook-type computers.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Patent is:

1. A communications card for use in connecting a downsized computer to a physical/electrical media connector of a communications system, the communications card comprising:

(a) an upper surface;

(b) a lower surface, the lower surface being separated from the upper surface by a distance smaller than the cross-section of the physical/electrical media connector, the electrical components of the communications card being positioned between the upper surface and the lower surface;

(c) an aperture formed in the communications card, the aperture extending from one of the surfaces into the communications card, the aperture being sized and configured so as to directly receive at least a portion of the physical/electrical media connector to connect the physical/electrical media connector to the communications card; and (d) access means for enabling repeated receiving and removal of the at least a portion of the physical/electrical media connector in the aperture from outside the downsized computer when the communications card is housed within the downsized computer.

* * * * *

UNITED STATES PATENT AND TRADEMARK OFFICE
CERTIFICATE OF CORRECTION

PATENT NO. : 5,547,401
DATED : August 20, 1996
INVENTOR(S) : Stephen C. Aldous, et al.

It is certified that error appears in the above-identified patent and that said Letters Patent is hereby corrected as shown below:

Column 2, line 20, "it" should read --if--

Column 8, line 20, "pan" should read --part--

Column 8, line 58, "foraged" should read --formed--

Column 22, line 55, "the surfaces" should read --the upper or lower surfaces--

Signed and Sealed this

Twenty-third Day of September, 1997

Attest:

BRUCE LEHMAN

Attesting Officer

Commissioner of Patents and Trademarks